United States Patent [19]
Ejzak et al.

[11] Patent Number: 6,069,883
[45] Date of Patent: *May 30, 2000

[54] CODE DIVISION MULTIPLE ACCESS SYSTEM PROVIDING ENHANCED LOAD AND INTERFERENCE BASED DEMAND ASSIGNMENT SERVICE TO USERS

[75] Inventors: Richard Paul Ejzak, Wheaton Township, DuPage County; Subhasis Laha, Aurora Township, DuPage County, both of Ill.; Sarath Kumar, Eatontown Township, Monmouth County, N.J.; Douglas Knisely, Wheaton Township, DuPage County, Ill.; Sanjiv Nanda, Plainsboro Township, Middlesex County; Chih-Lin I, Manalapan Township, Monmouth County, both of N.J.

[73] Assignee: Lucent Technologies Inc, Murray Hill, N.J.

[ * ] Notice: This patent is subject to a terminal disclaimer.

[21] Appl. No.: 08/841,980

[22] Filed: Apr. 8, 1997

Related U.S. Application Data

[63] Continuation-in-part of application No. 08/539,476, Oct. 5, 1995, Pat. No. 5,734,646.

[51] Int. Cl.$^7$ ........................................... H04J 13/02
[52] U.S. Cl. ..................... 370/335; 370/342; 370/441; 370/468
[58] Field of Search ..................... 370/468, 465, 370/335, 342, 441, 522, 229, 230, 235, 252; 455/450, 452, 67.1, 67.3, 63

[56] References Cited

U.S. PATENT DOCUMENTS

| 5,619,492 | 4/1997 | Press et al. | 370/468 |
|---|---|---|---|
| 5,734,646 | 3/1998 | I et al. | 370/468 |
| 5,857,147 | 1/1999 | Gardner et al. | 370/468 |

*Primary Examiner*—Huy D. Vu

[57] ABSTRACT

A code division multiple access system method and apparatus provides for allocation of increased bandwidth to a requesting mobile station. An access controller receives a data burst request (from either a requesting mobile station or from an external network already in connection with the mobile station) requesting a first data rate in excess of the basic data rate B allocated to a mobile station of a first cell. The access controller determines an increased data rate which is to be granted to said mobile station without causing excessive interference at said first cell and at least one adjacent cell and transmits a data burst assignment to a base station of said first cell indicating the increased data rate which has been granted to said mobile station. In another feature, the access controller processes a data burst request received from a mobile station involved in a soft handoff between multiple base stations and negotiates with those base stations for an increased data rate which may be granted to the requesting mobile station. One feature enables additional interactions to further refine the allocation process. A variety of system architectures are also described.

31 Claims, 14 Drawing Sheets

OPTION A (PPE HANDOFFS)

OPTION B (MULTIPLE PPE HOPS)

OPTION C (SEPARATE FSD FROM RLP)

FSD: FRAME SELECTION AND DESTINATION
ENC: ENCRYPTION
RLP: RADIO LINK PROTOCOL

CODE DIVISION MULTIPLE ACCESS SYSTEM PROVIDING ENHANCED LOAD AND INTERFERENCE BASED DEMAND ASSIGNMENT SERVICE TO USERS

REFERENCE TO PARENT APPLICATION

This is a continuation-in-part of application Ser. No. 08/539,476, filed Oct. 5, 1995 now U.S. Pat. No. 5,734,646.

TECHNICAL FIELD OF THE INVENTION

This invention relates to code division multiple access (CDMA) systems and, more particularly, to a CDMA system for allocating data rate to a user based on the load and interference of the system.

BACKGROUND OF THE INVENTION

The advantages of code division multiple access (CDMA) for cellular voice have become well known. In spite of the advantages, conventional CDMA systems have very limited per user throughput and are not well suited to "bandwidth on demand" local area network (LAN)-like applications. In fact, current CDMA standards operate in circuit mode, assume a homogeneous user population, and limit each user to a rate which is a small fraction of the system capacity. As mentioned above, CDMA relies on the averaging effect of the interference from a large number of low-rate (voice or circuit-mode data) users. It relies heavily on sophisticated power control to ensure that the average interference from all users from an adjacent cell is a small fraction of the interference from the users within a cell. The imperfect power control in a homogeneous system has a direct impact on system performance.

Moreover, even with perfect power control, users at higher data rates in a system with mixed traffic result in large adjacent cell interference variations which drastically degrade the system capacity. This problem has so far precluded the provision of high data rate services in cellular CDMA.

Additionally, it would be desirable if the provisioning of such high data rate services in cellular CDMA could be made compatible with the existing network architecture for voice and data.

SUMMARY OF THE INVENTION

Our inventive Load and Interference based Demand Assignment (LIDA) techniques protect voice (and other high priority or delay sensitive) isochronous users while accommodating the peak data rate needs of high data rate users when the load on the system permits. More particularly, our method and apparatus provides a code division multiple access (CDMA) system, including an access controller and plurality of cells each having a base station and multiple mobile stations, with a way of allocating bandwidth to a mobile station. The access controller receives a data burst request (from either a requesting mobile station or from a network, external to the system, already in connection with the mobile station) requesting a first data rate in excess of the basic data rate B allocated to a mobile station of a first cell. The access controller determines an increased data rate which is to be granted to said mobile station without causing excessive interference at said first cell and at least one adjacent cell and transmits a data burst assignment to a base station of said first cell indicating the increased data rate which has been granted to said mobile station.

According to one feature, the data burst request received from the mobile station includes pilot strength information for the base station of said first cell and a base station of at least one cell adjacent to said first cell which the access controller uses to determine an increased data rate which is to be granted to the requesting mobile station without causing excessive interference at said first cell and said at least one adjacent cell.

According to another feature of the invention, when a data burst request is received from a mobile station involved in a soft handoff between at least base stations, that data burst request is received at all of the base stations in soft handoff with that mobile station. Thereafter, in response to the data burst request received from the mobile station, the access controller requests an increased data rate from the at least two base stations. After receiving an allocation response from each of the at least two base stations indicating an increased data rate available at that base station, the access controller transmits a burst assignment to the base stations indicating an allocated increased data rate which may be granted to the requesting mobile station, the allocated increased data rate not exceeding the minimum of the increased data rate assignments received from the two base stations.

According to another feature, following the requesting step, the access controller may transmit an allocation request to the at least two base stations indicating a preliminary increased data rate which may be granted to the requesting mobile station, the preliminary increased data rate not exceeding the minimum of the at least two increased data rates received from the at least two base stations. Thereafter, the access controller receives a second allocation response from each of the at least two base stations indicating an updated allocated data rate that can be made available at that base station and then sends a burst assignment to the at least two base stations indicating the updated allocated increased data rate which is to be granted to the requesting mobile station.

Other features enable the at least two base stations to wait a predetermined time period before determining the increased data rate available at that base station and sending an allocation response to the access controller. Other features provide that the allocated increased data rate uses multiple CDMA channels and where each CDMA channel handles a basic data rate bandwidth unit. According to architecture features of the invention, 1) the at least one base stations may use a separate channel element for interfacing to each CDMA channel, 2) the access controller may be collocated with a Packet Processing Unit or at one of the base stations that the mobile is in soft handoff with, 3) The Packet Processing Unit includes a Packet Processing Element (PPE) for processing Frame Selection and Distribution (FSD), Encryption (ENC) and Radio Link Protocol (RLP) data for each of the multiple CDMA channels assigned to a mobile station, 4) the PPU includes a PPE for processing all FSD, ENC and RLP data for the basic data rate CDMA channel and a separate PPE for processing all FSD and ENC data of remaining ones of the multiple CDMA channels, and 5) the PPU includes a PPE for processing all FSD data and a inter-working function (IWF) for processing all ENC and RLP data for each of the multiple CDMA channels.

BRIEF DESCRIPTION OF THE DRAWING

In the drawing,

FIGS. 15A–14C show optional packet processing element connectivity arrangements for a multiple channel soft handoff.

GENERAL DESCRIPTION

To curtail the potentially large interference variation in cellular CDMA systems serving mixed traffic, the present invention incorporates autonomous and/or coordinated network access control that accounts for channel loading and interference. It dynamically assigns higher data rates to users while simultaneously adjusting the Quality of Service (QOS) for each user according to service requirements. Higher data rates are assigned to users by either permitting users to transmit on multiple channels simultaneously or by using other means, such as variable spreading gains, variable channel coding rate, variable chip rate, varying the modulation (Walsh modulation, coded modulations, BPSK, QPSK . . . ) etc. An elegant scheme that achieves this is Multi-Code CDMA (MC-CDMA) with dynamic demand assignment, described in U.S. Pat. No. 5,442,625 entitled "Code Division Multiple Access System Providing Variable Data Rate Access" which issued on Aug. 15, 1995 to Richard D. Gitlin and Chih-Lin I. The QOS is adjusted through the power control with a target Frame Error Rate (FER) and signal to interference ratio ($E_b/N_0$) on the channel. In this invention, the network uses a control strategy that accounts for channel loading, interference, and soft handoff in making the rate assignment and QOS decisions. It ensures priority for voice users, if so desired. Thus, dynamic, packet-like demand-assigned access enables users with different services to access the channel at desired rates and QOS requirements.

Our autonomous network access control is referred to herein as the Load and Interference Based Demand Assignment (LIDA) for providing dynamic demand-assigned burst access in a wireless CDMA network. LIDA ensures protection of voice (and other high priority or delay sensitive) isochronous users, but allows peak rate access by high data rate users when the load on the channel permits. With best-effort type QOS guarantees, the high data rate service is best suited for typical LAN- and Wide Area Network WAN-type computer applications (including services based on mobile IP (as discussed by C. Perkins in "IP Mobility Support," *Internet Engineering Task Force*, Mar. 21, 1995) and CDPD ("Cellular Digital Packet Data System Specification: Release 1.1," *CDPD Forum, Inc.*, Jan. 19, 1995)), less so for high rate applications with stringent real time constraints.

DETAILED DESCRIPTION

In the following description, each item or block of each figure has a reference designation associated therewith, the first number of which refers to the figure in which that item is first located (e.g., 110 is located in FIG. 1).

Figure 1:
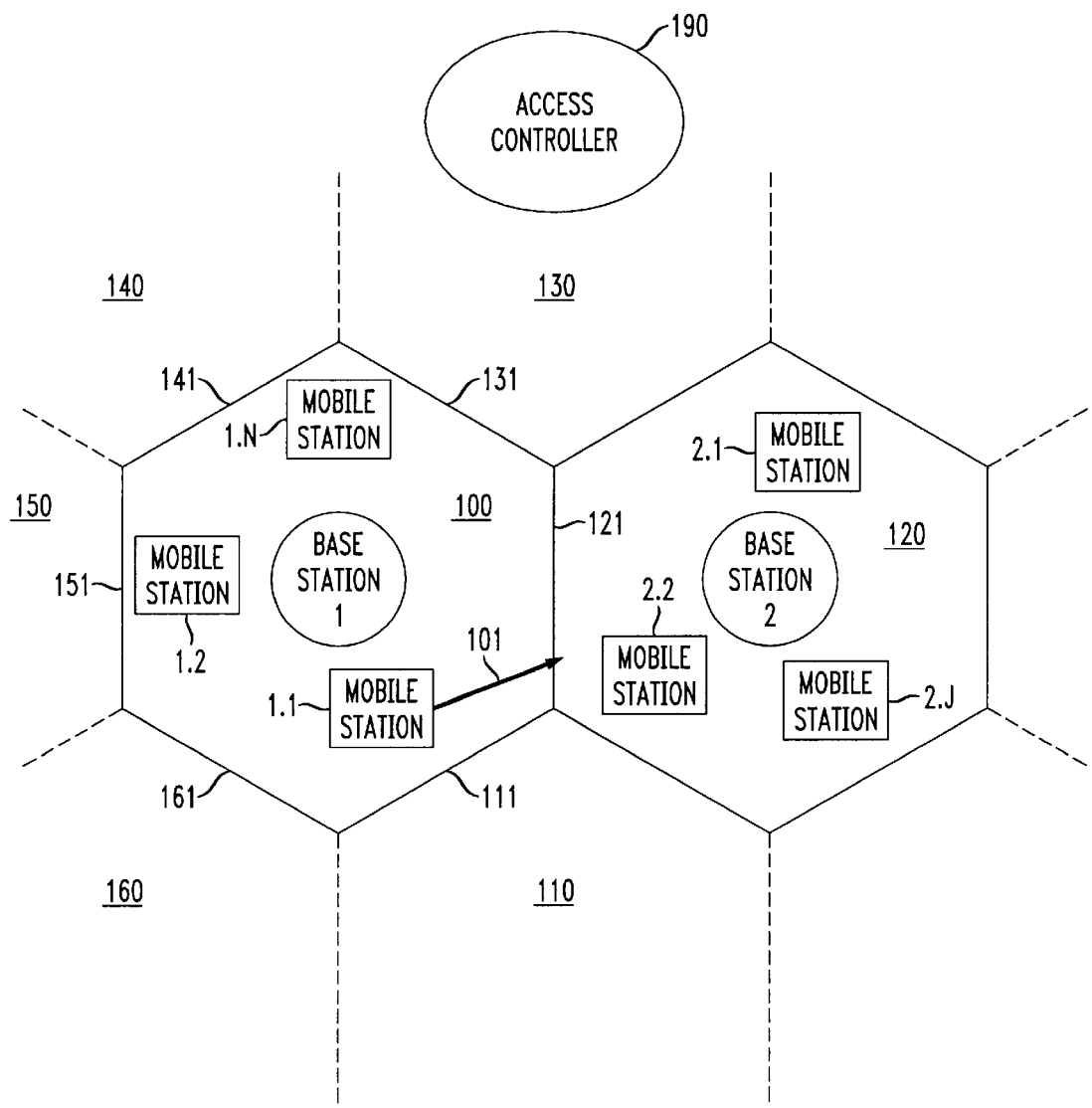
FIG. 1 shows a prior art CDMA system in which the present invention may be utilized.

With reference to FIG. 1, we describe a prior art multicode (MC) CDMA system. The illustrative MC-CDMA system includes a regular hexagonal grid of cell sites 100, 110, 120, 130, 140, 150 and 160, each including a plurality of mobile stations (e.g, MS1.1–MS1.N) which enables each of a plurality of users (1–N) to communicate with its associated base station BS1 within a cell site. Illustratively, cell site 120 includes base station BS2 and mobile stations MS2.1–MS2.J.

Our LIDA control, as will be described in a later paragraph, may be implemented in each base station, e.g., BS1–BS2, etc. In one embodiment of the present invention, an access controller 190 is utilized to provide coordinated access control (FIG. 1) between neighboring base stations (e.g., between BS1 and BS2). In such an arrangement, access controller 190 communicates with all of the base stations to control the assignment of a higher-than-basic data rate and burst length. While the access controller 190 is shown in a separate location, it may be co-located with a base station or the central switch.

Radio distance is the effective radio loss that a signal, transmitted from a base station, incurs in transit to a mobile station. The received pilot power Pi at a mobile station is then $P/z_i$, where P is the transmitted pilot power from each base station and $z_i$ is the effective "radio distance." As a mobile station MS1.1 in cell 100 approaches cell 120, the power level of the received pilot from base station BS2 increases beyond a threshold, $T_{add}$, and the mobile station will enter "soft handoff." During soft handoff, the mobile station communicates with both base stations BS1 and BS2. We extend the use of the pilot measurement to burst access control in this invention.

Figure 2:
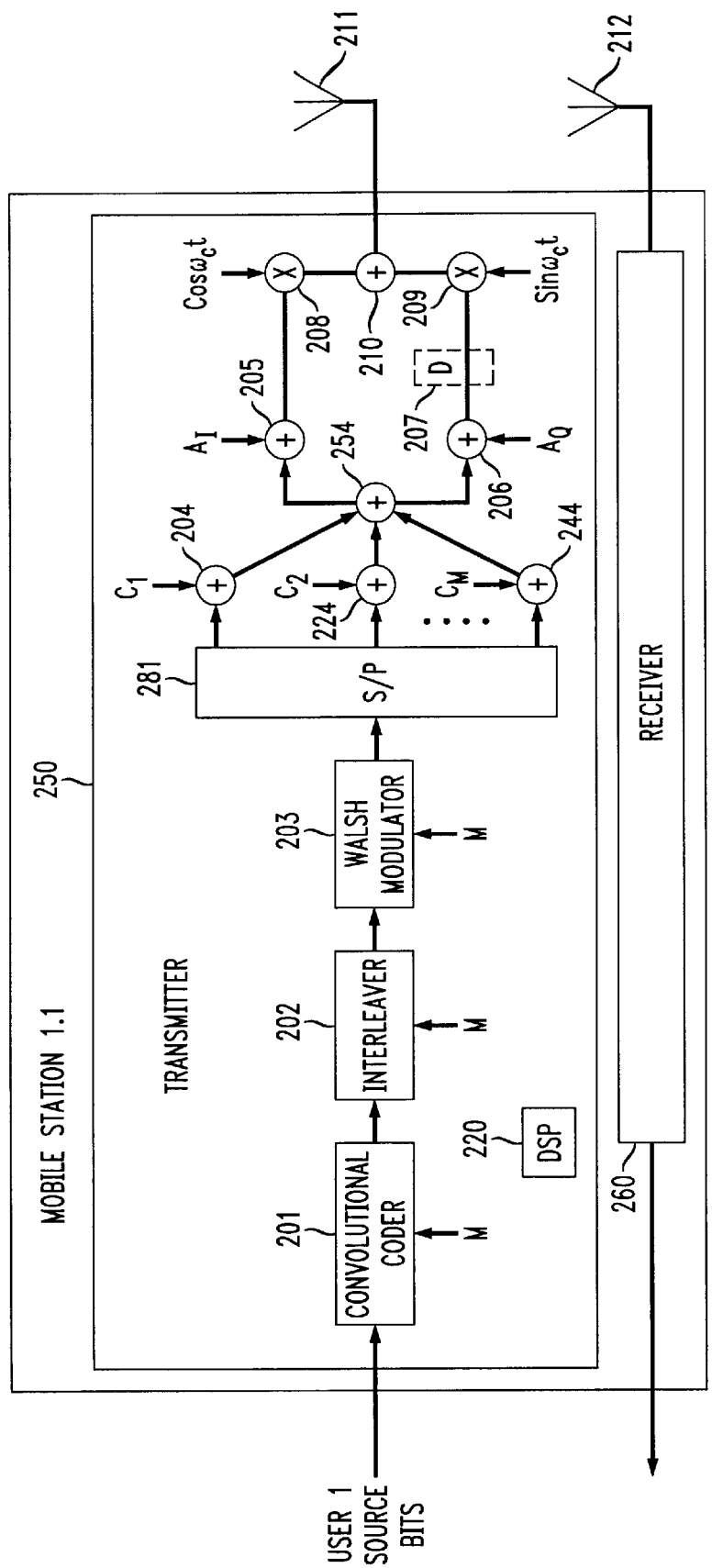
FIG. 2 shows a block diagram of an illustrative mobile station of the CDMA system of FIG. 1.

With reference to FIG. 2, an illustrative block diagram of mobile station MS1.1 is shown to include a transmitter station 250 and a receiver station 260. Illustrative examples of mobile stations are described in the previously reference U.S. Pat. No. 5,442,625. The transmitter station 250 includes a convolutional coder 201 which receives digital information (or data signals) from user 1 at a first data bit rate. The output of convolutional coder 201 is coupled to interleaver 202 and then to a Walsh modulator 203, all of which are well known in the prior art. The serial-to-parallel (S/P) station 281 is connected to the output of the Walsh modulator 203 and converts the user's input digital information stream into M basic data rate serial information streams. In the following, we use MC-CDMA as an illustrative method of providing higher data rates.

The serial-to-parallel station 281 converts a user's serial digital information input, which may be up to $M_{max}$ times the basic source rate B (where $M_{max} \cdot B \leq$ channel rate), into M data streams (where M is an integer$\leq M_{max}$) The basic rate B is also referrred to herein as a data rate unit. The outputs of S/P station 281 connect to code spreaders 204, 224, and 244, which spread each of the M data streams, respectively, into a channel bit rate using codes $C_1$, $C_2$, and $C_M$ which are unique to user 1. The combiner 254 combines the output of code spreaders 204, 224 and 244. The output signal combiner 254 is coupled to coders 205 and 206. In coder 205, an in-phase code $A_1$ further encodes the signal from combiner 254. Similarly, coder 206 further encodes the signal from combiner 254 using a quadrature-phase code $A_Q$. The codes $A_1$ and $A_Q$ are common to all mobile stations of FIG. 1.

The output of coder 205 is used to modulate the carrier signal $Cos\omega_c t$ in modulator 208. The output of coder 206 is used to modulate the carrier signal $Sin\omega_c t$ in modulator 209. In certain applications, an optional delay station 207 may be utilized to provide better spectral shaping. The output of modulators 208 and 209 are radio frequency signals which are combined in combiner 210 and transmitted via antenna 211 over the air to a base station (e.g., BS1 of FIG. 1).

A base station (e.g., BS1) transmits at a different carrier frequency which is received and decoded by mobile stations MS1.1–MS1.N within its cell site 100. In our illustrative example, receiver 260 of mobile station MS1.1 includes a demodulator (not shown) to demodulate the carrier frequency to obtain a channel bit rate signal which is decoded using codes $A_1$ and $A_Q$ and then de-spread using the associated code sequence $C_1$ to obtain the information data signal to be outputted to user 1.

The base station, e.g., BS1, operates in a similar manner to receiver 260 of mobile station MS1.1 to receive, decode and de-spread the user 1 information data signal. Similarly, the other mobile stations, illustratively represented by mobile station MS1.N, operate in the same manner as mobile station MS1.1, except that user N has a unique code $C_N$ to distinguish it from user 1. In mobile station MS1.N, the in-phase and quadrature codes $A_1$ and $A_Q$, respectively, as well as the carrier frequency $f_c$ are the same as those used for mobile station MS1.1.

Figure 3:
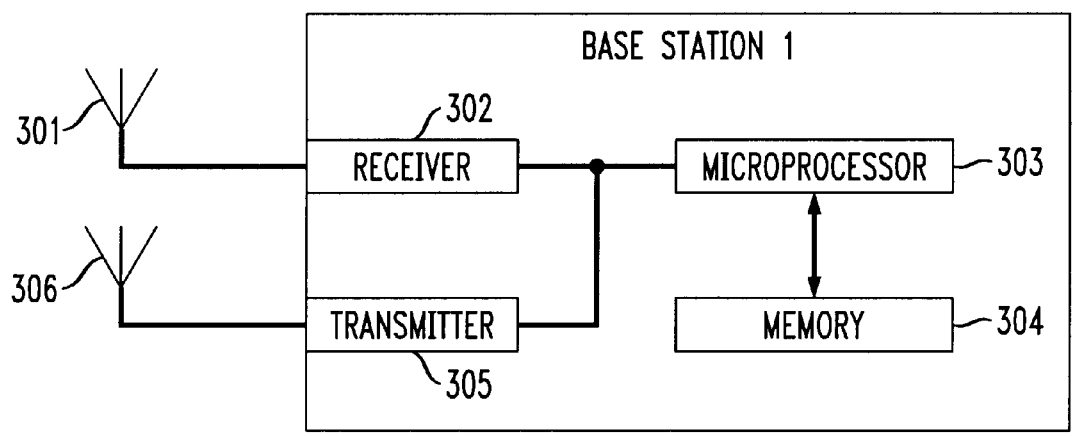
FIG. 3 shows a block diagram of an illustrative base station of the CDMA system of FIG. 1.

With reference to FIG. 3, there is shown an illustrative block diagram of base station BS1. The modulated carrier signal is received at antenna 301 and processed by MC-CDMA receiver 302 under control of processor 303. The receiver 302 operates in a similar manner to the previously described MC-CDMA receiver 260 of mobile station MS1.1 of FIG. 2. Similarly, the MC-CDMA transmitter 305 transmits via antenna 311 and operates in a similar manner to transmitter 250 previously described.

Processor 303, acting under control of programs resident in memory 304, controls the operation of MC-CDMA receiver 302, MC-CDMA transmitter 305 performs typical well-known base station functions and may perform for cell 100, as well, some or all of the load and interference based demand assignment (LIDA) function in accordance with the present invention. This LIDA function is shown in FIGS. 4–9 and is described in later paragraphs. However, the standard functions performed by base station BS1 which are not pertinent to the understanding of the present invention are not discussed herein.

Interference Calculations

With continued reference to FIG. 1, we start by investigating the in-cell and out-of-cell interference caused by a single high rate data user (using multiple codes). The results confirm the need of our demand assignment coupled with network control algorithms, LIDA. The procedure of LIDA algorithms allowing burst access at rates up to M times the basic rate is generally based on the following:

the load information in the cell and its neighbors;

the pilot strength measurements provided by the mobile;

coordination of the burst rate, burst length and burst starting time between neighbor cells.

Coordination of system resources between data users capable of high bit rate burst mode operation and high priority voice users can be managed through LIDA. The LIDA algorithms with various levels of complexity are presented below. To simplify the discussion, we describe the control procedures for the system with a single data user. Procedures for multiple data users are very similar. The control mechanism presented herein is essential to provide a shared burst mode access mechanism over CDMA and is claimed here as a new invention.

In the following description, we assume a CDMA cellular system of FIG. 1 having power control and including only voice users at the various mobile stations MS1.1–MS1.N, MS2.1–MS2.J. Consider cell site 100: when only voice users are served, each in-cell interferer (e.g., MS1.1) causes identical interference at the base station BS1, and therefore appears to be exactly one user, while the average out-of-cell interferer (e.g., MS2.1), aggregated from all cells, in a regular hexagonal grid cellular system 110–160 appear to be $\gamma$ users. Assuming a path loss exponent of 4, $\gamma$ is around 0.5. In a system with N voice users per cell, the total interference at each base station is:

$$I_0 = \alpha N(1+\gamma) \qquad (1)$$

where $\alpha$ is the speech activity factor. We use the nominal interference, $I_0$, in a voice-only system with a capacity of N users per cell, as the reference QOS in the subsequent discussion.

Let us now examine the in-cell interference with a single data user at time 't' transmitting at M times the basic rate (9.6 kbps or 14.4 kbps, depending on the reference system configuration). Assuming a speech activity factor $\alpha$ around 0.4, under ideal power control, an active data user is equivalent to 2.5 M (=M/$\alpha$) voice users in its cell. If M=4, the data user consumes the equivalent resources of 10 voice users; i.e., the "equivalent load" of such a data user is 10. With a typical capacity of 15–25 voice users per cell, it is easy to see that a single high rate data user has a large impact on the cell capacity. (Obviously, a mobile station data user's activity factor would affect its average demand; however, the demand assignment of a high data rate burst must account for the maximum interference generated by the data user during its high data rate transmission.)

The impact on out-of-cell interference is considered next. In the voice-only system, where voice users are uniformly distributed in the cells 110–160, most of the out-of-cell interference comes from the users in other cells (e.g., MS2.1) that are near the cell boundaries 111–161. Due to the large path loss exponent, users further away from the boundary (e.g., MS2.N) contribute little to out-of-cell interference. As the high data rate user (e.g., MS1.1), transmitting at M/$\alpha$ times the average data rate of a voice user, moves along path 101 closer to the boundary 121, the in-cell interference to BS1 remains at around $M/\alpha$ while the out-of-cell interference to BS2, caused by the high rate data user, rapidly rises beyond what was computed for the voice system. However, to maintain the required Quality of Service (QOS), the total interference at each cell must be controlled to be no more than $I_0$.

To quantify our discussion above, assume there are $N_v$ voice users per cell and one active (transmitting) high rate data user in the host cell, the total interference in the host cell and in the closest neighboring cell (with respect to that data user) can be expressed as follows:

$$I_d(r) = \alpha N_v(1+\gamma) + M\gamma_d(r), \quad (2)$$

where 'r' is the distance from the active high rate data to its host cell site. $\gamma_d(r)=1$ for the host cell since it is power controlled by that cell and $\gamma_d(r) \approx (2R-r)^4/r^4$ for the neighboring cell it approaches, where R is the cell radius. The access control mechanism for high rate data users must satisfy the constraint:

$$I_d(r) \leq I_0 \quad (3)$$

in both the host cell and the approached neighboring cell. We will seek to adjust $N_v$, the number of voice users, or M, the multiple of the basic data rate B being used by the data user, as a function of 'r', in order to meet the interference constraints. The issues and our strategies are elaborated in the next sections.

Interference Management Using Pilot Strength Measurements

In the above discussion, the out-of cell interference due to a data user is a function of $(2R-r)/r$. Hence, the access controller should use the knowledge of the distance of the mobile from the cell site to determine permitted values of $N_v$ and M. There are two issues with using 'r' as the control variable. First, the distance of the mobile from the cell site cannot be determined accurately. More importantly, although the discussion of out-of-cell interference above is in terms of the distance 'r', the actual interference is strongly dependent on the shadow fading conditions in addition to the distance. Hence, control based on geographic distance is neither optimal nor practical. The present invention uses a control based on radio distance, using pilot strength measurements to address both issues. This solution can easily be an integral part of a CDMA system.

In current CDMA systems, mobile assisted soft handoff is implemented as follows. The base station provides the mobile with a neighbor list of pilots. The mobile periodically measures the pilot strength on its neighbor list and transmits it to the cell site. If the pilot strength of a base station to which the mobile is not connected is greater than a threshold $T_{add}$, the base station initiates a soft handoff for the mobile. The present invention extends the concept of using pilot strength measurements for soft handoff decisions to using it for access control of high data rate users.

Figure 4:
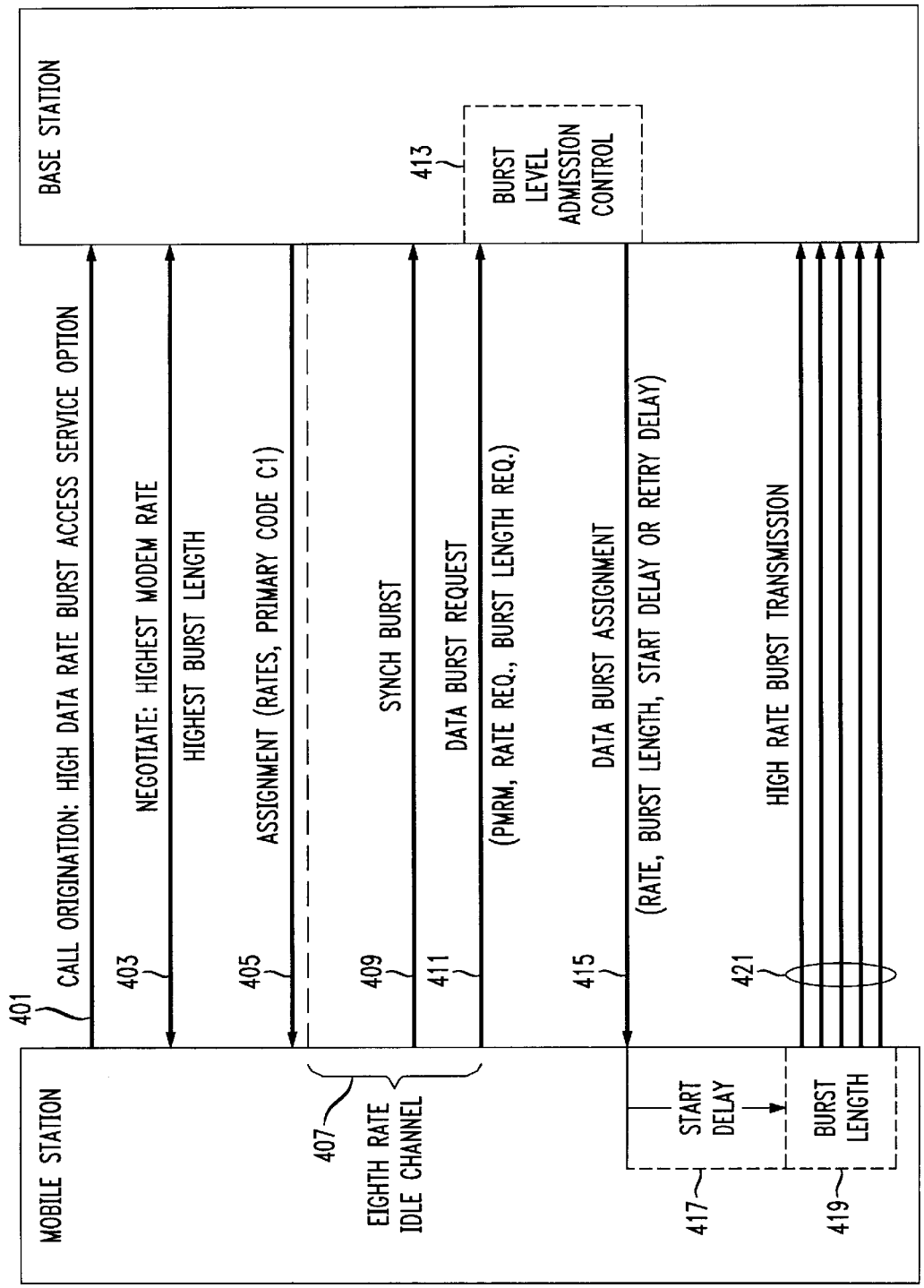
FIG. 4 shows a flow diagram describing how a base station provides load and interference based demand assignment services to a mobile user in accordance with the present invention.

With reference to FIG. 4, we describe a CDMA system of FIG. 1 incorporating our LIDA capability (hereinafter LIDA). In step 401, a mobile originates a call requesting high data rate burst mode service option. In step 403, the mobile and base station negotiate the highest modem rate and the highest burst length for the mobile.

As shown in step 405, each user is assigned a unique primary code, i.e., $C_1$, determined as the user-specific PN sequence. When a user is quiescent, 407, a very low rate (say, eighth rate) (sub-rate) signaling channel is maintained using its primary code. This sub-rate channel helps in maintaining synchronization and coarse power control. It is maintained whether the user is "connected" to one base station or is in soft handoff with multiple cells. Since the transmission during eighth rate frames is intermittent, both the synchronization and the power control are inadequate if the quiescent period is long.

Hence, any transmission from the mobile after a long quiescent period 407 may be lost. This problem is overcome by requiring the mobile to transmit a synch burst 409 of one (or more) basic rate frame(s) at the end of a "long" quiescent period. Following the synch burst that gives the receiver time to synchronize and provides power control feedback, the mobile station signals a request 411 for data burst transmission using signaling messages over the basic rate (B) channel. Alternately, instead of the synch burst in steps 407, 409, the mobile station could be required to transmit the request 411 multiple times.

The access request 411 from the mobile station contains the data rate requested and the burst length requested. The maximum burst length that may be requested by mobile is specified by the system (and is chosen to best coordinate shared access between users). In addition, to provide interference information to the base station, the access request from the mobile includes pilot strength information, (for base stations of cells in its neighbor list, for example, MS1.1 would include pilot strength measurements on the base station of cells 110–160). (Note, the inclusion of the pilot strength measurements within the access request is independent of (and in addition to) any such reports used for handling soft handoffs.) The pilot strength measurements received from the mobile (e.g., MS1.1) indicate to the base station (e.g., BS1) the interference levels that that mobile would generate at neighboring base stations (e.g., BS2). This measure of interference accounts for both the distance loss and shadow fading and thus is a measure of the radio distance to the neighboring base station, and will be used to make access control decisions of step 413.

Specifically, in the presence of shadow fading, the average interference at the cell site for the basic voice-only system is modified from Equation 1 as described in the article by K. S. Gilhousen et al. entitled "On the Capacity of a Cellular CDMA System" (*IEEE Trans.Veh. Technol*, Vol. VT-40, No. 2, May 1991, pages 303–312). Let us denote it as $I_0^s = \alpha N(1+\gamma^s)$, where $\gamma^s$ is the average out-of-cell interference in the presence of shadow fading. Similarly, in an integrated voice and data system, the interference factor for a data user in a neighboring cell is $\gamma_d^s(z_1,z_2)=z_1/z_2$, where $z_1$ and $z_2$ are the path loss of the mobile to the host cell and the neighboring cell, respectively. Note that $\gamma_d^s(z_1,z_2)=1$ in the case of the host cell because of power control. The path loss (radio distance) $z_1$ and $z_2$ include the distance loss component as well as the shadow fading component. The interference constraint becomes:

$$I_d^s(z_1,z_2) = \alpha N_v(1+\gamma^s) + M\gamma_d^s(z_1,z_2) \leq I_0^s. \quad (4)$$

The values $z_1$ and $z_2$ are derived from the pilot strength measurements.

As will be described in FIG. 5, step 413 is performed by an access controller located at the base station (or at one of the base stations in case of soft handoff) or at a separate location shown by 190 of FIG. 1. In step 415, this assignment is then transmitted to the mobile. The mobile then goes active in the burst mode at the high data burst rate at the designated time and the designated rate. If the scheduled list is longer than the threshold L, the mobile is told to retry later (Retry Delay) in step 415. The base station selects the value of this parameter based upon loading conditions at that base station. When a mobile receives a delay parameter in a data burst assignment message 415, it initiates such a delay, step 417, before starting its transmission of the assigned burst length, step 419, and at the assigned data rate, step 421. In an alternate embodiment, the mobile may be required to wait for an explicit BEGIN message to begin high data rate transmission.

Figure 5:
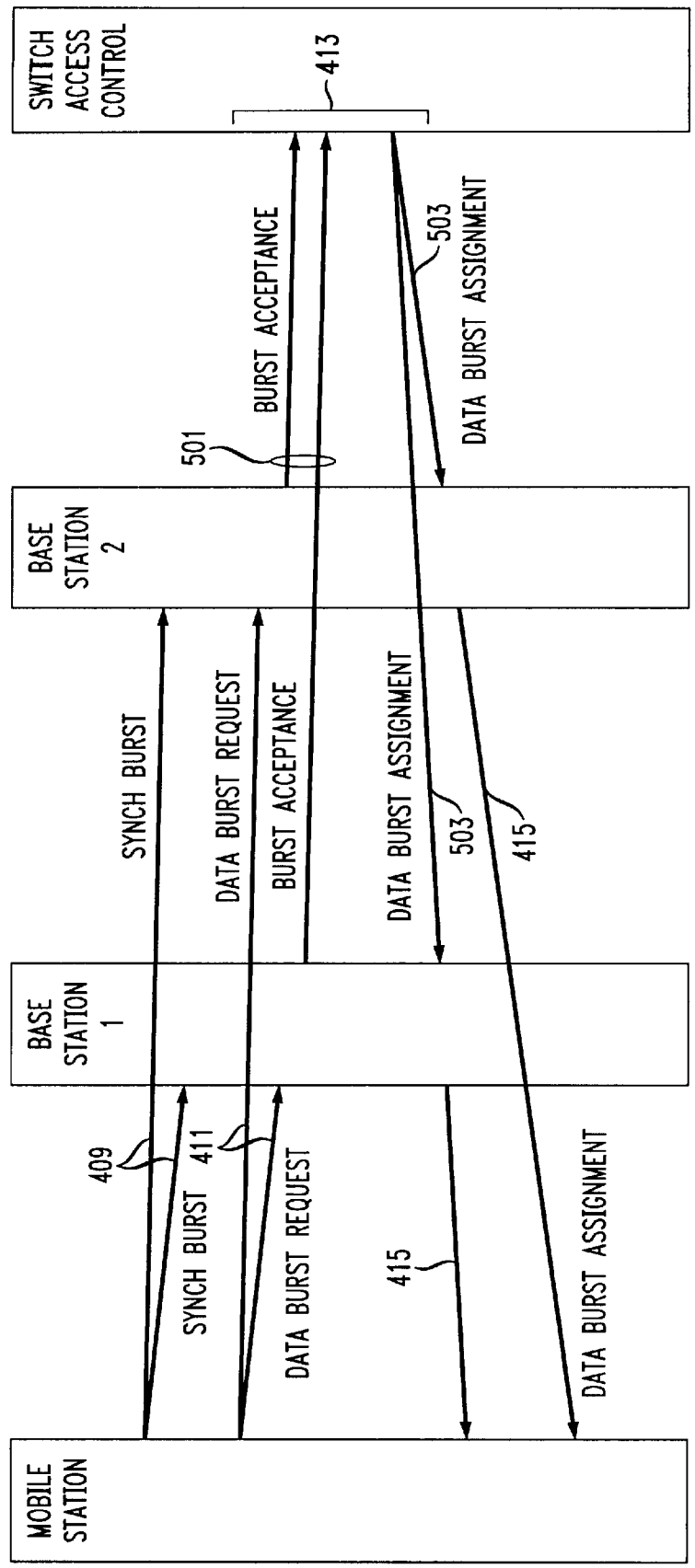
FIG. 5 shows a flow diagram of how the switch access controller coordinates a soft handoff between cells.

With joint reference to FIGS. 1, 4 and 5, we describe how the access controller coordinates a burst access of a mobile station (e.g., MS1.1) during soft handoff from a base station BS1 in cell 100 and a neighbor base station BS2 in cell 120. The steps 409, 411 and 415 proceed as previously described. FIG. 5 shows a burst acceptance message 501 sent to access controller which performs the processing steps 413 required during the soft handoff. These processing steps will be described in more detail in later paragraphs with reference to FIGS. 6, 7, 8 and 16. After processing, access controller sends a data burst assignment command, step 503, to both base stations and they send the data burst assignment message 415 to the requesting mobile station.

Autonomous Access Control

Figure 6:
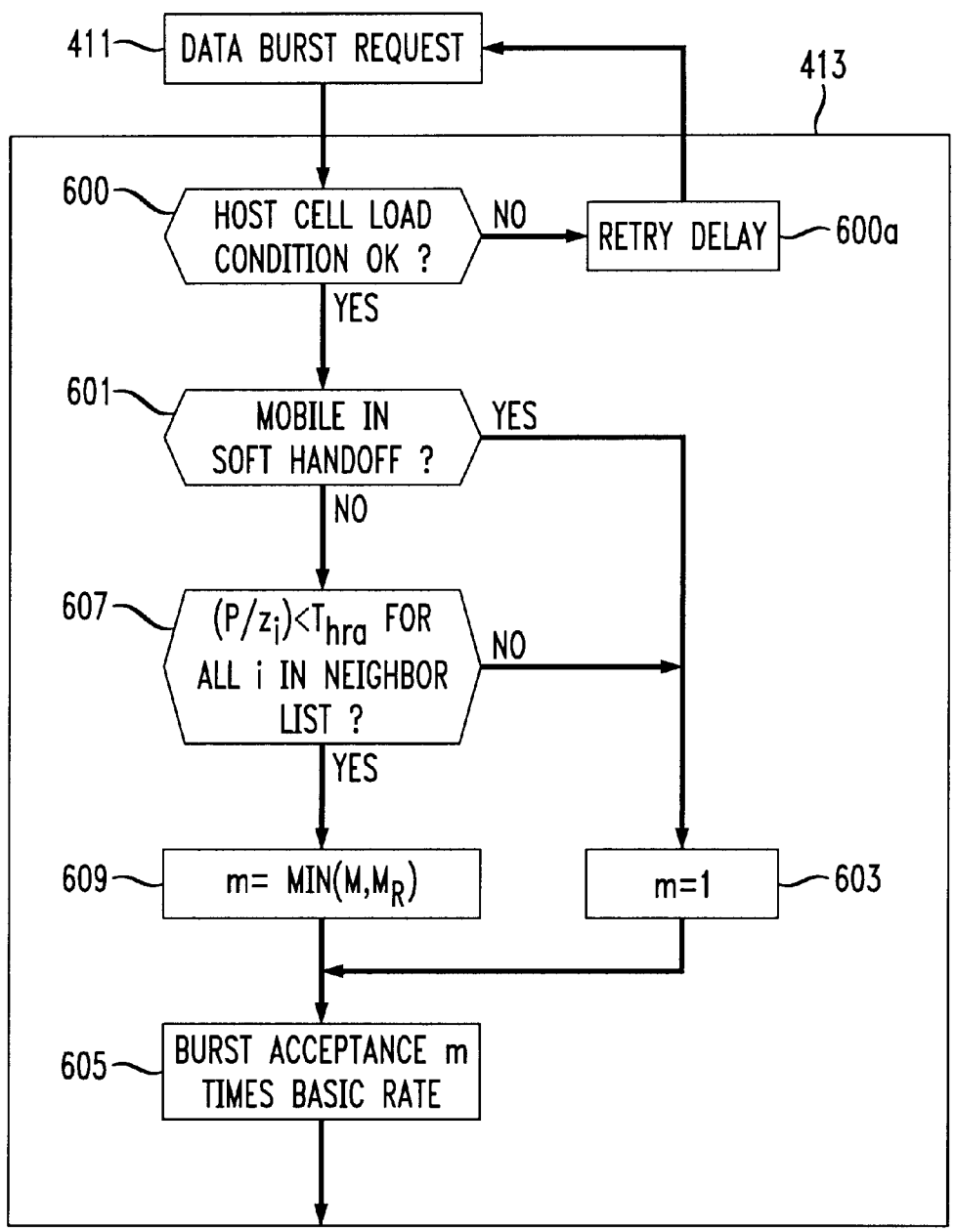
FIG. 6 shows a flow chart of the autonomous access control feature of the present invention.

With reference to FIGS. 4 and 6, we describe one embodiment of our autonomous access control feature of the present invention. As described in step 411 above, the mobile station provides pilot strength measurements in the access request. If the host's load condition is too close to a predetermined load level, step 600, then a retry delay command is sent, in step 600a. If the host load condition permits a burst access, but the mobile is in a soft handoff, step 601, then the access controller limits the mobile to the basic data rate B (i.e., multiplier m=1). The burst assignment message, step 605, permitting a data rate of m times the basic rate B is sent to the requesting mobile. If the host load condition permits burst access and the mobile is not in soft handoff, then step 607 is performed. In step 607, the base station pilot strength measurements for all neighbors, 'i', are determined. The pilot strength measurement $P/z_i$ (PMRM of 411) is formed for all base stations 'i' in the neighbor list, where P is the known transmission power level of the base stations and $z_i$ is the path loss or radio distance. If $P/z_i$ is below a high rate data access threshold $T_{hra}$, it indicates that the mobile will not cause any excess interference to neighbor base stations and the mobile is permitted (step 609) to transmit a rate which is the minimum of the requested multiple M or the maximum multiple $M_R$. (The mobile and the base station can locally generate the M codes needed for the multiple rate transmissions using subcode concatenation in MC-CDMA as described in the previously referenced patent. A new method for the moble station and the base stations to generate multiple PN sequence masks for multiple reverse channels is described here in the section on Reverse Link Channels.) In step 605, the access controller sends the burst assignment message to the requesting mobile.

The threshold $T_{hra}$ is chosen such that the total interference received from a requesting mobile at any neighbor base station is less than $I_0$. Note that to accommodate high rate data users the system may limit the number of voice users $N_v$ to be smaller than the maximum permissible in a voice-only system. There is a tradeoff between raising $T_{hra}$ and increasing $N_v$, the number of voice users per cell.

If it is determined that the requesting mobile is to be permitted to transmit at the high rate, the base station may have to schedule the burst transmission. Since the load and interference situation may be time varying, the decision to permit is valid only for a period of time Q that depends on system load, shadow fading dynamics, and user mobility. This time Q corresponds to L frame durations. The base station checks its list of scheduled bursts and adds the requesting mobile to the list if it is shorter than L frames.

If any one of the neighbor base station pilot strengths $(P/z_i)$ in step 607 is determined to be higher than the threshold $T_{hra}$, the mobile is permitted only to transmit at the basic rate B, step 603. High rate access will not be allowed for the requesting mobile until all neighbor base station pilot strengths are found to be below $T_{hra}$. Note that the soft handoff decisions are made separately. The soft handoff add and drop thresholds $T_{add}$ and $T_{drop}$ will typically be larger than the high rate data access threshold $T_{hra}$. Consequently, as previously discussed in step 601, mobiles in soft handoff will only be allowed to transmit at the basic rate B (i.e., m=1). Conversely, any transmission at basic rate B requires no demand assignment.

This autonomous access control is attractive for its simplicity, but it has some limitations. For example, mobiles may be in soft handoff in a significant portion of the coverage area. Schemes that permit higher rate access even during soft handoff are presented hereinafter.

Enhanced Autonomous Access Control

Figure 7:
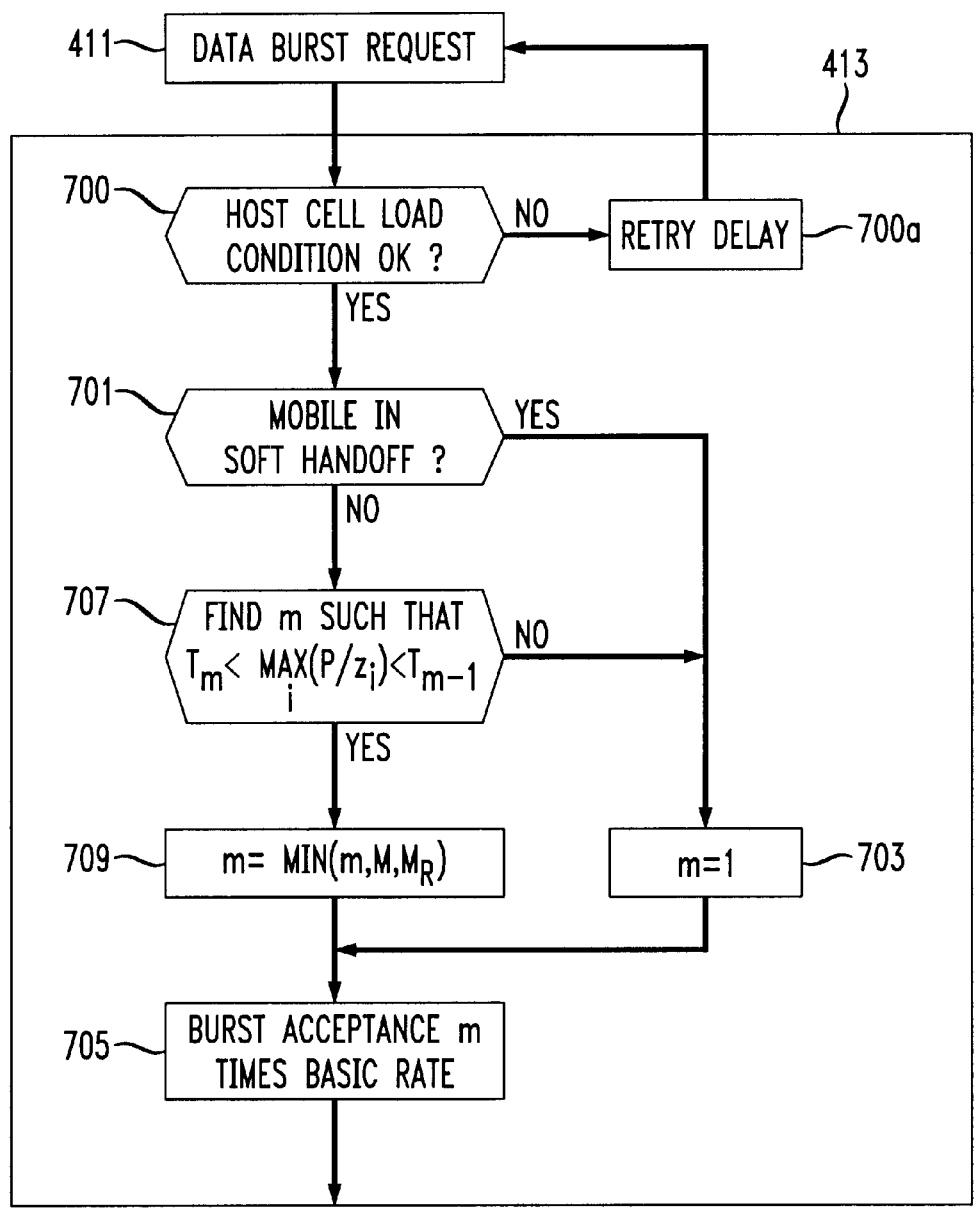
FIG. 7 shows a flow chart of an enhanced autonomous access control feature.

With reference to FIG. 7, we describe our enhanced autonomous access control feature. The previously described autonomous access control permits only two selection data rates, namely a basic rate (m=1, step 603) and a high rate, which is the minimum of the requested rate M or the system's maximum rate $M_R$ (step 609). The enhanced autonomous access control feature creates multiple thresholds which increase the coverage area for higher rate data users such that rates two, three, . . . times (even non-integer multiples) higher than the basic rate B can be assigned. Thus, data users requesting higher data rates are usually assigned a higher data rate when they are more centrally located in their cell and assigned succeedingly lower data rates as they approach a cell boundary.

Figure 10:
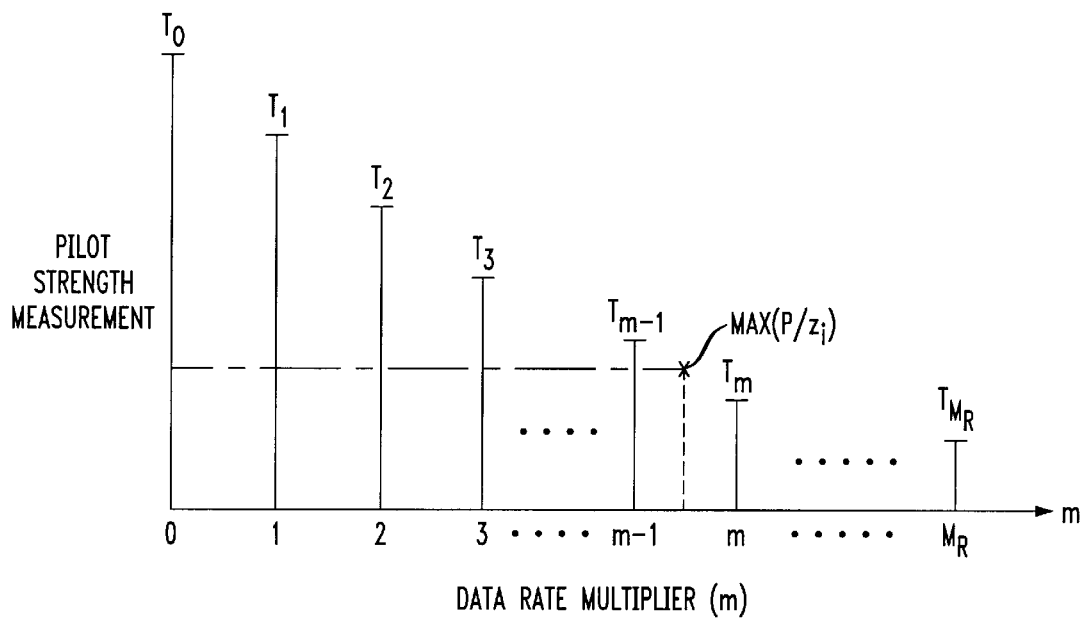
FIG. 10 shows an illustrative graph of the received pilot strength measurements versus the data rate multiple m.

In steps 700 and 700a, the host cell's load condition check is performed in the same manner as in steps 600 and 600a. If the mobile (e.g., MS1.1) is in soft handoff, then step 703 and step 705 are performed in the same manner as steps 603 and 605. However, if the mobile is not in soft handoff, then the access controller selects a data rate using step 707. In step 707, the maximum pilot strength $P/z_i$ from all base stations 'i' in the neighborhood is determined from the set of pilot strength measurements reported by mobile MS1.1, in step 411. The access controller compares the maximum pilot strength with a set of thresholds $\{T_m, m=0, 1, \ldots M_R\}$, where $T_m > T_{m+1}$, as shown in FIG. 10. Each threshold $T_m$ corresponds to a different permitted data rate multiple m. For consistency, $T_0 = P$ and $T_{M_r} = T_{hra}$. If any neighbor's pilot strength $P/z_i$ is not below the threshold $T_1$, then the mobile MS1.1 is permitted by its base station BS1 only to access the basic rate B (m=1), as shown in step 703. If the maximum of pilot strength $P/z_i$ is between $T_m$ and $T_{m-1}$, then the data rate multiple m is selected as shown in FIG. 10, so that the interference at any neighbor cell's base station is less than $I_0$. Again, in step 709, the access controller selects the data rate multiple m to be no greater than the system limit $M_R$ and the requested multiple M. In step 705, the burst assignment message 503 includes the rate multiple m. As before, the base station checks its list of scheduled bursts and adds the mobile to its request list, if the list is shorter than L frames, and transmits the assignment message 415 to the mobile. If the scheduled list is longer than the threshold L, the mobile is told in message 415 to retry later.

On the other hand, if in step 707 any neighbor's pilot strength is above the $T_1$ threshold, then it means that a high rate transmission from that mobile MS1.1 may cause excessive interference in that neighbor's cell. Consequently, the mobile is restricted to the base rate (m=1) as shown in step 703.

The present invention enables an access controller, either centrally located or located at one or more base stations, e.g., BS1, to autonomously determine the largest value of 'm', corresponding to 'm' times the basic rate B, at which the mobile MS1.1 may transmit while satisfying the following interference constraint:

$$\alpha N_v(1+\gamma^s)+m\gamma_d^s(z_1,z_2)\leq I_0^s, \quad (5)$$

where $\gamma_d^s(z_1,z_2)=1$ for the host cell. Thresholds $\{T_m$ are defined to satisfy Equation 5 for bit rate multiples m=1, 2, . . . ; up to $M_R$. Again, mobiles in soft handoff will be only allowed to transmit at basic rate (m=1); which requires no extra negotiations among cells involved in the handoff.

This enhanced scheme of FIG. 7 requires little additional complexity as compared to the single threshold scheme of FIG. 6.

Figure 9:
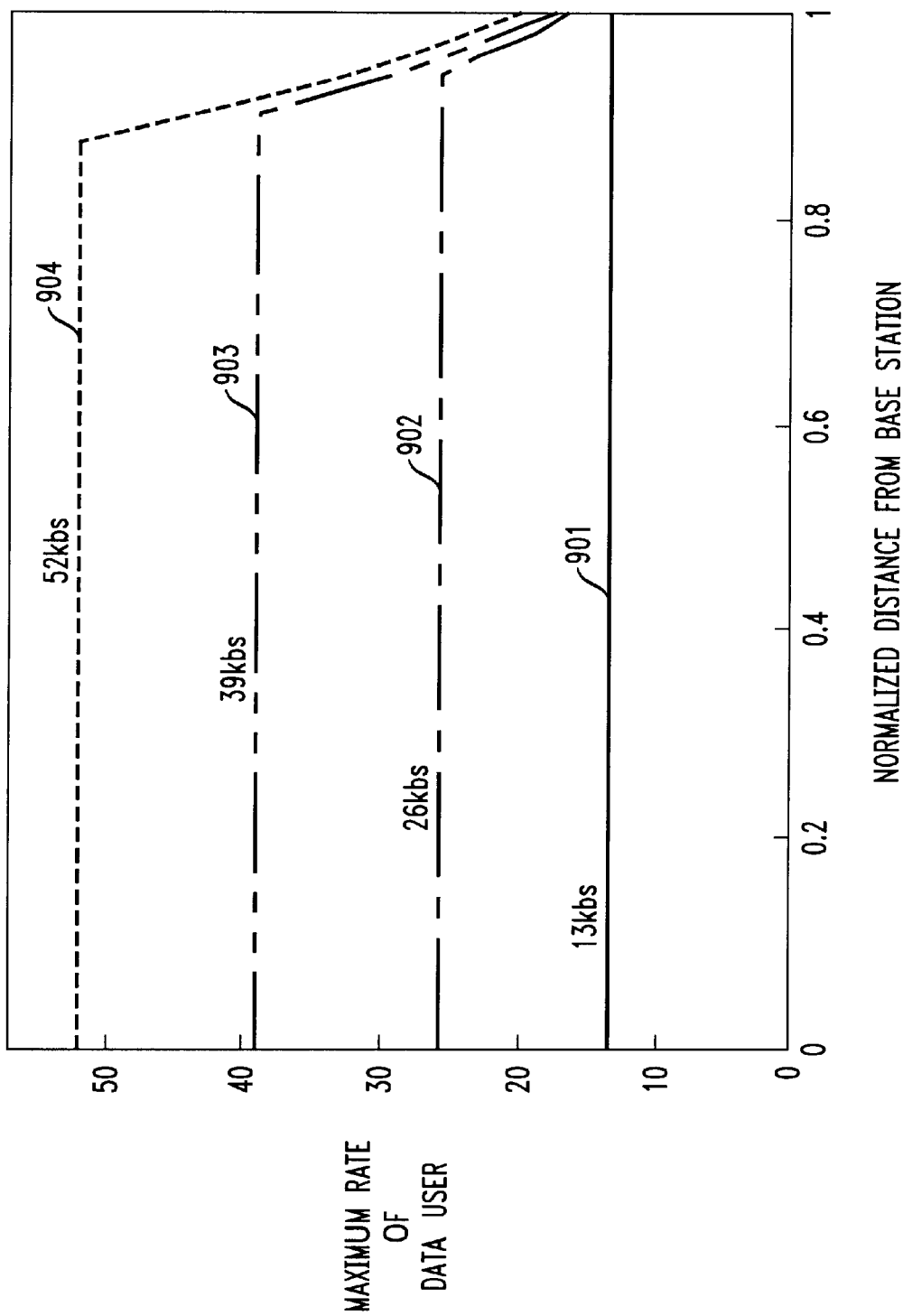
FIG. 9 shows an illustrative graph of the data rates allowed to a user as a function of distance to the base station.

With reference to FIG. 9, there is shown a graph of how allowed data rates for a mobile user in a cell with 25 voice users vary as a function of the distance to the base station, assuming 21 voice users are in the handoff cell. FIG. 9 shows that these multiple thresholds 901–904 are quite close to each other and may not be distinguishable within the noisy pilot strength measurements; and the drop off from acceptable interference at m times the basic rate B (902–904) to basic rate B (901) is quite rapid in terms of the normalized distance from the base station.

Neighbor Coordinated Access Control

Figure 8:
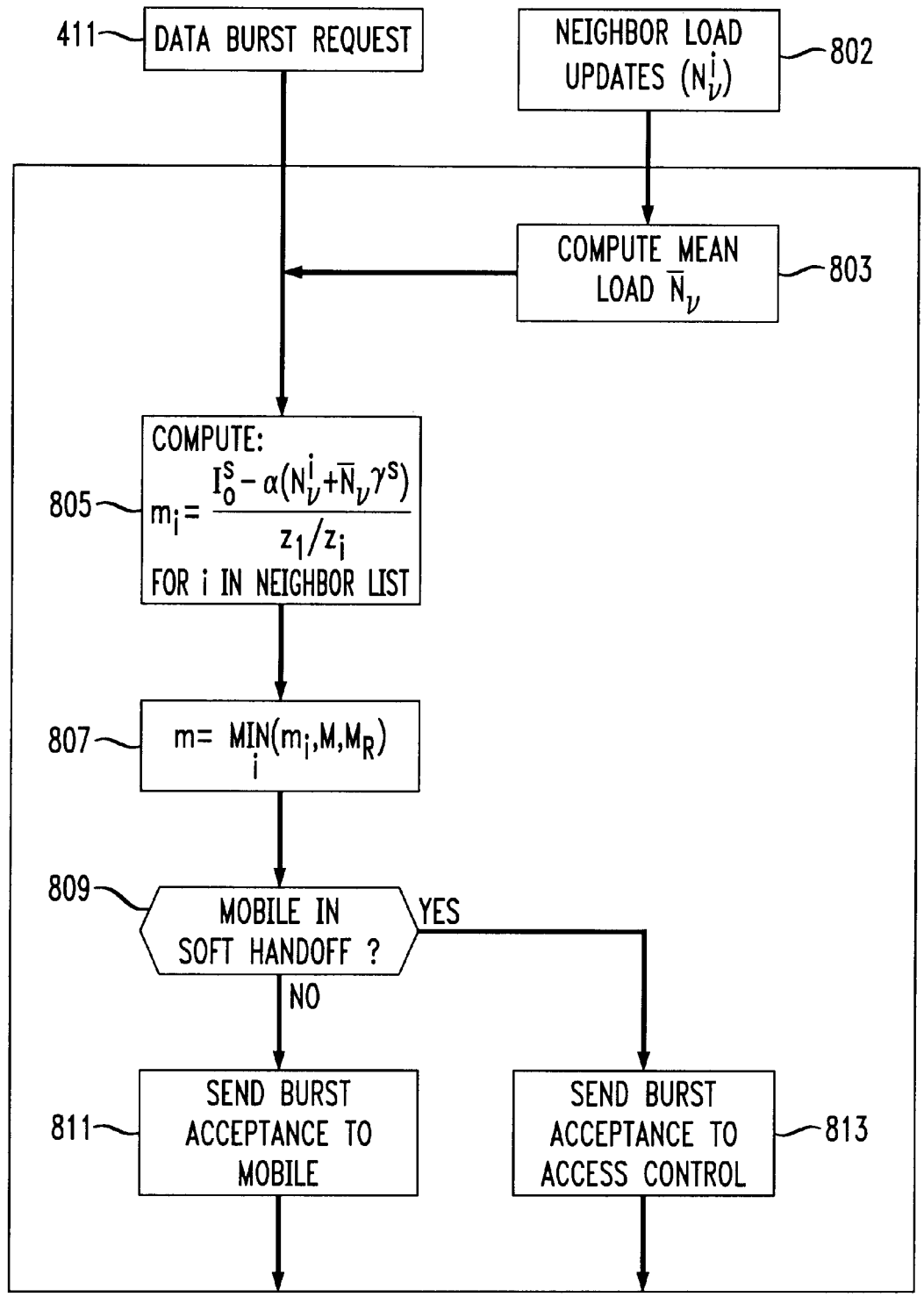
FIG. 8 shows a flow chart of a neighbor coordinated access control.

With reference to FIG. 8, we describe our neighbor coordinated access control feature. Neither of the schemes above account for instantaneous loading in the neighbor cells. As discussed in the following paragraphs, light loading in neighbor cells can be exploited to permit higher rate access while still meeting the interference constraint $I_O^s$.

When a mobile MS1.1 is connected to a single base station BS1, the rate assignment decision in response to a high data rate access request, 411, is facilitated if the load at the neighbor cells is known, 802, to the base station BS1. In step 803, the base station computes the mean load $\overline{N}_v$. In step 805, instead of fixed thresholds, the base station BS1 makes rate assignment decisions by determining the smallest 'm' that satisfies the following inequality for all neighbor base stations and itself:

$$\alpha(N_v^i+\overline{N}_v\gamma^s)+m\gamma_d^s(z_1,z_i)\leq I_0^s, \quad (6)$$

where $\overline{N}_v$ is the average number of voice users per cell in the neighborhood, $N_v^i$ is the number of voice calls in cell 'i' and $z_i$ is the "radio distance" of the data user to base station of cell 'i', where 'i' is the index of the neighbor list. The host cell corresponds to i=1. Actually, for each neighbor cell, the value $N_v^i$ should be considered as the "load in terms of equivalent" voice calls. By choosing the smallest 'm' that satisfies Equation 6 (step 805) for all neighbor cells 'i', we ensure that the admission of a burst at 'm' times the basic rate B will not cause excessive interference at any neighbor. In this case, the only communication required is for the neighbor cells to periodically provide updates, step 802, of their current load. In step 807, the multiple 'm' is selected to be the minimum of $m_i$, M and $M_R$. In step 809, if the mobile is not in soft handoff, then, as before, if the scheduled list is shorter than L frames, the rate assignment and burst parameters are provided to the mobile, step 811; otherwise, the mobile is told in step 811 to retry.

When the mobile is in soft handoff, in step 809, the access request (that includes pilot strength measurements) is received by all the connected base stations. Again, the simplest strategy is to let the mobile transmit only at the basic rate (without access control) when it is in soft handoff. To permit higher data rates in soft handoff, more sophisticated coordination between neighbor base stations is necessary. Each base station performs similar computations as in step 805 to determine the maximum permitted rate 'm', the permitted burst length and the earliest starting time. However, instead of transmitting this assignment to the mobile, this information is forwarded, in step 813, to the access controller located at the "primary" base station or at the central switch (190 of FIG. 1). The controller 190 compares the assignment made by each of the base stations, and then chooses the minimum of the rate assignments and burst lengths proposed by the soft handoff cells and the last of the proposed starting times. It then creates the assignment message (503 of FIG. 5) and transmits it to the mobile in soft handoff (step 415 of FIG. 5). If any one of the base stations indicates that its scheduled list is long and the mobile must retry, then a retry message is sent out to the mobile in step 415. Note that because the controller 190 must choose the minimum of the rates allowed by the different cells and the last of the starting times, care must be taken to avoid compromising channel utilization efficiency in the cells involved in the soft handoff.

Network Architecture

Figure 12:
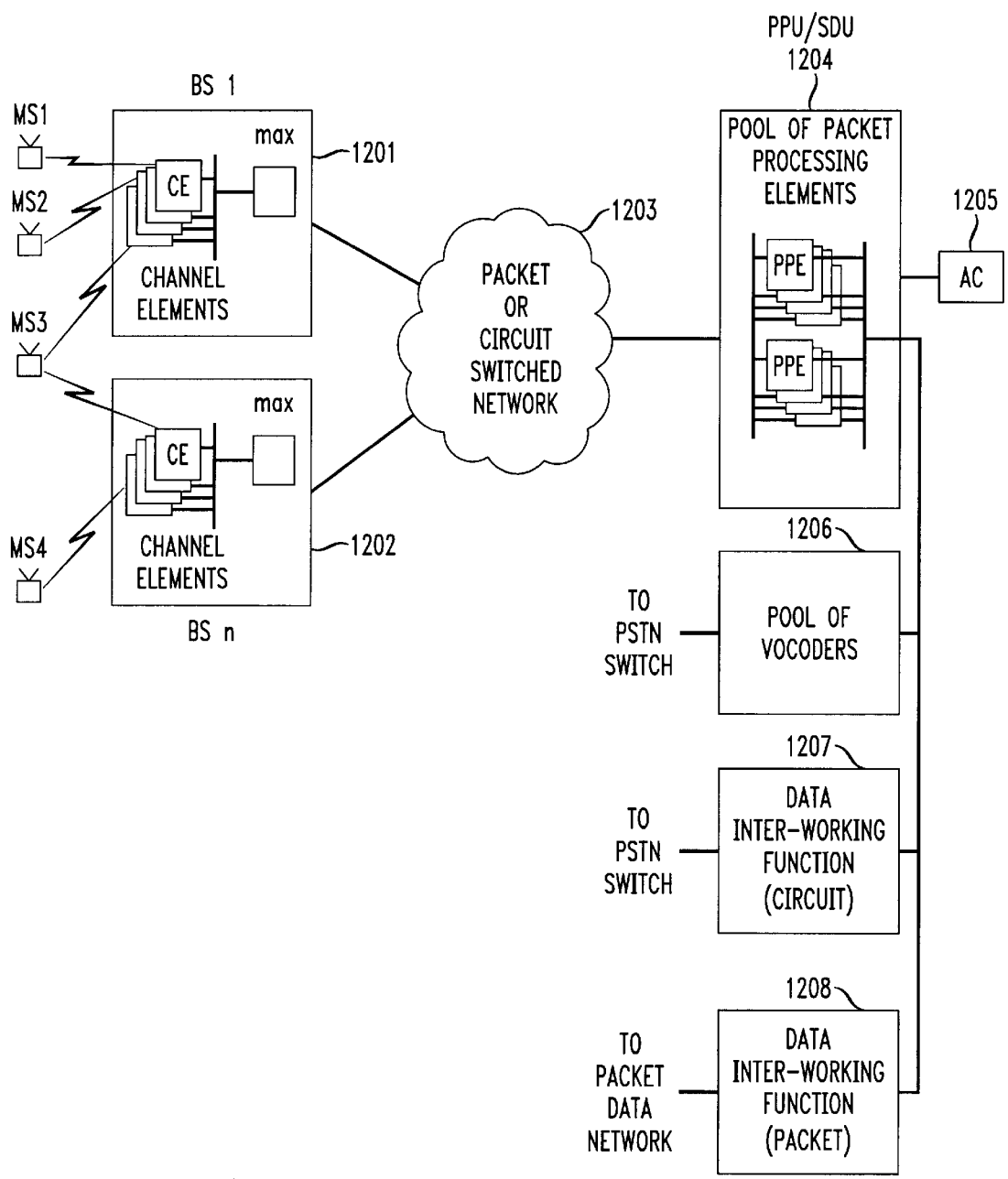
FIG. 12 shows an abstract view of an illustrative CDMA network.

FIG. 12 shows an abstract view of an existing CDMA network architecture. Each BTS, 1201–1202, has several channel elements, each corresponding to a duplex air interface CDMA channel for interfacing to one of the mobile station MS1–MS4. Each channel element corresponds to a single Walsh code on the forward link to a mobile station (MS), and a single mobile specific pseudo-noise (PN) code mask on the reverse link from that MS, as is well known in the prior art. Multiple channel elements are multiplexed on to a single physical link. A packet or a circuit switching network, 1203, connects the channel elements (CEs) to a pool of packet processing elements (PPEs) at the packet processing unit (PPU) 1204 [also referred to herein as a Selection and Distribution Unit (SDU)]. The packet or circuit switched network 1203 provides complete connectivity, so that each channel element CE can be connected to any PPE.

In interim standard, IS-634 Rev A, terminology, the PPU is also been referred to as the Selection and Distribution Unit (SDU), more closely reflecting its actual functions of frame selection on the reverse link, and frame distribution on the forward link. The SDU also multiplexes and demultiplexes in-band signaling from the user data (or voice) which is communicated to Access Controller (AC) 1205. The SDU also interfaces voice signals via a pool of Vocoders 1206 to a Public Switched Telephone Network (PSTN), and data signals via either a Data Inter-working Function 1207 circuit connection to the PSTN or via a Data Inter-working Function 1208 packet connection to the PSTN.

In accordance with the present invention, for high speed data, additional functions and messaging is required between the base stations BSs and the SDU. Since this implies an expanded SDU function, we will, hereinafter, refer to the expanded SDU 1204 as the Packet Processing Unit (PPU) 1204. For high speed packet data service, we assume that the PPE assigned to a mobile is able to communicate in-band signaling with Access Controller (AC) 1205, which handles that mobile's burst access request. In this manner, the function of the previously described access controller (190 of FIG. 1) is implemented using the PPU 1204 alone or in combination with the AC 1205.

The AC 1205 coordinates burst assignment through negotiation with the multiple base stations BSs 1201–1202 involved in soft handoff. In this negotiation, AC 1205 represents the mobile's demand for resources, while the base stations 1201–1202 coordinate the requests from multiple mobiles based on its current load and channel availability. The Packet Processing Unit (PPU), in addition to providing the frame selector and AC communications functions, also provides radio link protocol (RLP) and encryption (ENC) functions for the data connections. While these functions can all be collocated with the PPU handling frame selection, this can lead to unequal distribution of load. Other embodiments are disclosed that disaggregate these functions based on their processing demands. These several alternative network architectures are described in later paragraphs. The proposed architecture and service description is also designed to permit joint voice and data communications.

Enhanced Burst Negotiation

The above described method permits sharing of the CDMA bandwidth between voice and high speed data and relies on pilot strength measurements reported by the mobile, and load measurements collected at the base station, to manage outage and interference. More efficient bandwidth utilization is achieved by sharing load information between neighbor base stations. The burst-mode high speed data is designed to be asymmetric, that is, a mobile terminal may be allotted high speed data transmission on either the uplink or the downlink as needed. Only a basic rate channel is allocated in the opposite (downlink or uplink, respectively) direction for signaling and recovery. Burst allocation techniques have been described in the previous sections of this specification. Results on the burst acceptance probability and coverage contours have been obtained and indicate that data service with a high peak rate can be provided.

When a mobile is in soft handoff (e.g., see MS3 of FIG. 12) and requests a high speed data burst (requiring multiple CDMA codes), it requires resources (additional CDMA codes) from the one or more base stations with which it is communicating. Thus for example, with reference to FIG. 12, assume that mobile MS3 requests 3 CDMA codes at each of base stations BS1 and BSn, while mobile MS4 is requesting 5 CDMA codes at BSn, and mobiles MS1 and MS2 are each already using 2 CDMA codes at BS1. Then depending on their respective resources, base stations either or both of BS1 and BSn may or may not be able to allocate the requested 3 CDMA codes to mobile MS3. In our example, if base stations BSn has less than 8 codes available, then the requests from mobiles MS1 and MS2 cannot both be satisfied by base station BSn, but rather the codes will have to be allocated between mobiles MS1 and MS2. Moreover, even if base station BSn has enough codes to accommodate both mobiles MS3 and MS4 it must first check that base station BS1 can accommodate the 3 codes requested by mobile MS3. Thus to prevent data loss during the soft handoff, both base stations BS1 and BSn have to be able to handle the 3 additional CDMA codes requested by MS3. The problem at each base station is to allocate codes to all the mobile requests, while using up as much as possible of the base station resources. Since, in prior art CDMA architectures the requests and the available resources are all distributed between the mobiles and the base stations, the coordination of allocation of burst bandwidth at the base stations involved in a soft handoff continues to be a problem.

In accordance with the present invention, since all of the requests and resource information are made available at a single access processor, that access processor can provide optimum allocation and assign base station resources to the various mobile requests. As will be described in the following paragraphs, for optimum allocation of resources, communications between the access processor and base stations may require one or more rounds of messaging therebetween.

Burst Negotiation Procedure

Figure 11:
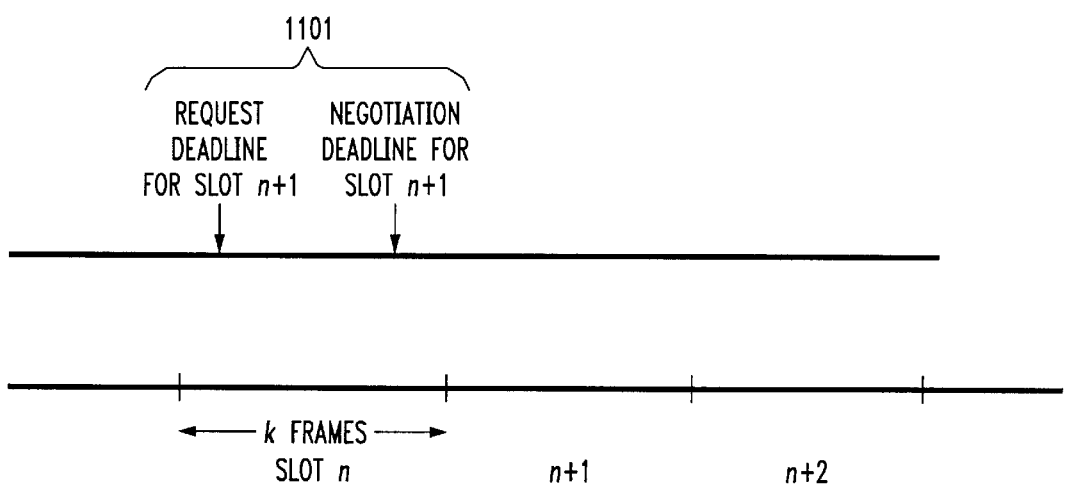
FIG. 11 shows an illustrative air interface time slot structure.

In this section we discuss an enhanced burst allocation scenario for high speed packet data service. The high speed data channel may be slotted, as shown in FIG. 11, and the length of a data slot is determined to be in the range of 240–480 msec (12–24 IS-95 frames). A mobile can be allocated a high speed burst that lasts several (e.g., 5–10) seconds, but the burst may be interrupted by soft handoff events (the adding or dropping of a base station as described in this specification).

Figure 16:
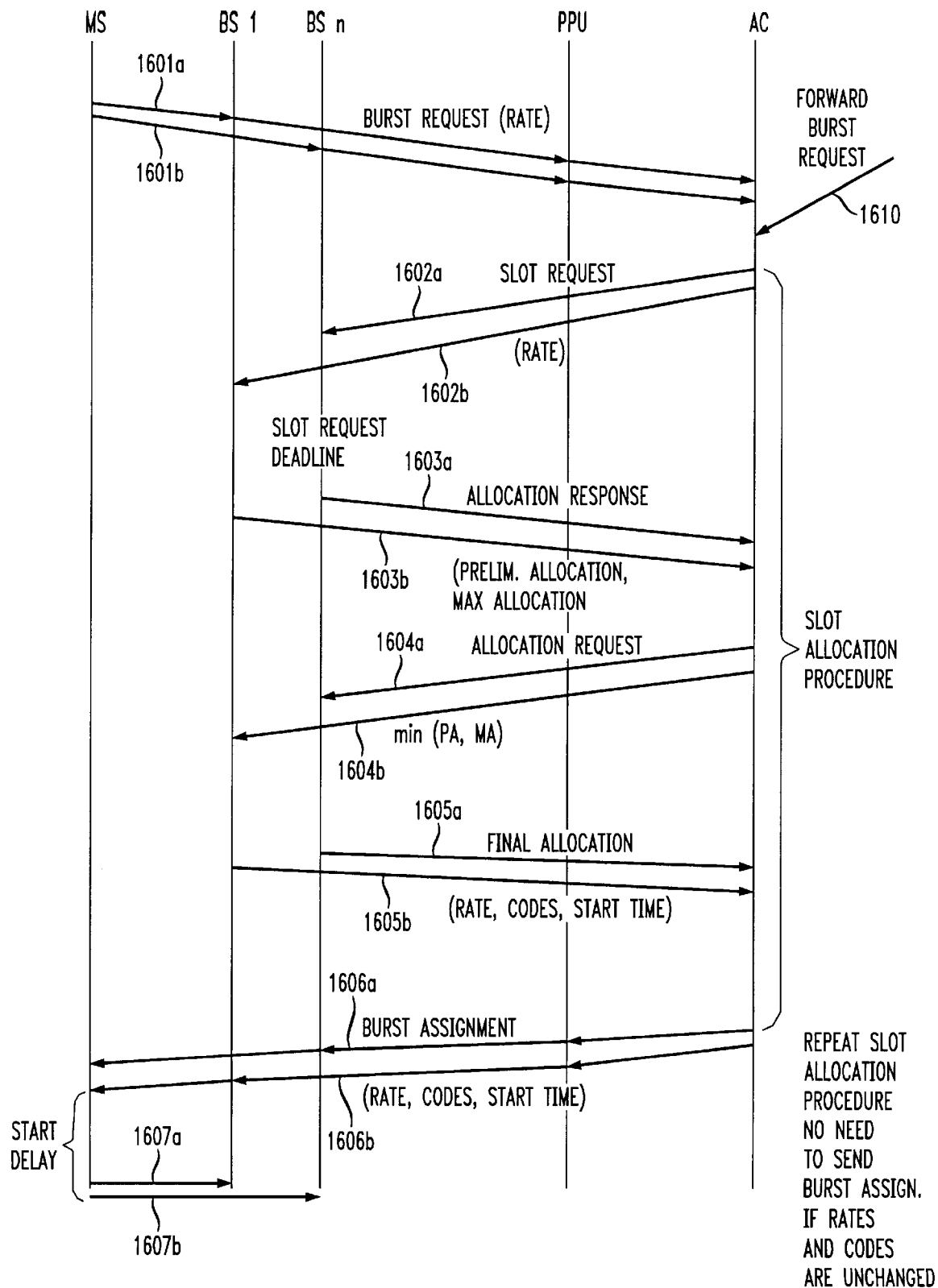
FIG. 16 shows an enhanced burst level allocation scenario for use with the CDMA network of FIG. 12.

With joint reference to FIGS. 12 and 16 we describe a typical burst access scenario. In steps 1601a and 1601b a mobile station MS3, in soft hand-off, requests burst transmission via base station BS1 and BSn, respectively. Although, there does not need to be a maximum burst length defined for interference constraints (the burst ends when a handoff add/drop event occurs), it is cleaner to define a maximal burst (e.g. several seconds say 5–10). This prevents hanging requests, for example when the mobile is lost/drops off—or request termination is lost.

The burst request goes to Access Controller (AC) 1205. An AC is associated with each active high speed data mobile. The AC may be co-located or associated with PPU 1204. AC 1205 makes slot and bandwidth requests to BS1 and BSn. In step 1602a and 1602b, Slot Requests are made for every slot at BS1 and BSn until the (a) mobile MS3 informs AC 1205 of burst termination, (b) the mobile MS3 does not update a new request when the previous one runs out, or (c) the burst is pre-empted by a handoff event. (Note that the handoff-trigger from the mobile MS3 arrives at the PPU 1204, and AC 1205 can be immediately informed to pre-empt the ongoing burst until the handoff event is complete.)

Each BSs, BS1–BSn, looks at all Slot Requests (including requested rate) that arrive from all AC 1205, corresponding to all burst requests received from mobiles during a designated request window. The request window for slot n+1 is the time between the slot request deadline for slots n and n+1, as shown by 1101 of FIG. 11.

Each BS uses an algorithm to make a preliminary slot allocation proposal based on all requests received at that BS, and sends an Allocation Request back to AC 1205. The BS algorithm uses the following guidelines:

It gives priority to on-going bursts. This avoids frequent re-assignment of base station and PPU resources.

It tries to share bandwidth (BW) fairly between multiple requests. If multiple requests arrive, the BSdivides available resources. If the BS "randomly" made a choice between the slot requests, then other "neighbor" BS's in soft handoff may make other choices, and in the bad cases, the slot could go unused. Dividing the BW and using up all resources is most efficient.

In steps 1606a and 1606b, each BS sends an Allocation Response which includes a Preliminary Allocation (PA) made to that mobile, as well as the Maximum Available (MA) resources at the BS for the next slot.

The AC 1205 collates the slot allocation proposals that it receives from all BSs in soft handoff (for the mobile). In steps 1604a and 1604b, AC 1205 computes and sends (min PA, min MA) in the Min Allocation Request to the BSs.

The BSs uses these Min Allocation requests to make a further reallocation. This two-stage negotiation achieves better channel utilization. The BS algorithms for reallocation also uses the previous guidelines to avoid frequent channel assignment changes, as well as fair sharing of bandwidth BW. The BSs then send a Final Assignment message to AC 1205 in steps 1605a and 1605b. This message also include the addresses of the hardware elements assigned by the BSs to handle the assigned channels.

In steps 1606a and 1606b, the AC 1205 sends out the Burst Assignment message to the mobile (via the PPU and the BSs). The AC also informs the BSs of the addresses of the PPEs assigned for the additional channels, either using this message or another message. The details of the PPE Assignment message depend on the architecture used as described herein, in section System Architecture for High Speed Data Services. The Burst Assignment message for the mobile station includes Rate, Codes and Start Time parameters. In steps 1607a and 1607b, after a delay to await its start time, the mobile begins its high rate burst transmission to BS1 and BSn, respectively.

The Slot Allocation Procedure is repeated as long as the AC 1205 is aware of any outstanding mobile station burst request. If the rate and code allocation for subsequent slot allocations is unchanged, it is not necessary to transmit a new Burst Assignment message to the mobile station over the air interface. Alternately, a simple message may be defined that specifies that the previous allocation is unchanged for a longer duration.

Network Messaging

As discussed in the burst negotiation scenario above, the AC 1205 and the base stations BSs involved in soft handoff require frequent messaging for channel assignment at the slot level. The most efficient and fastest method of communication between AC and all BSs involved in the connection to the user is over the packet connection between the BSs and the PPU that is used to carry voice and data traffic therebetween. This ensures that the AC to BSs connection is also "automatically" updated during handoff. This avoids having separate links from the AC to each BS. Instead, the AC connects to the PPE handling that mobile and the PPE connects to all BSs in soft handoff. Alternately, special signaling channels, separate from the packet connection, may be established between the AC and the BSs involved in soft handoff for each call. These signaling connections from BSs to AC will also be updated along with the connections from the BSs to PPU at the time a new soft handoff leg is added or an existing one is dropped.

Packet Processing Connectivity Options

Figure 13:
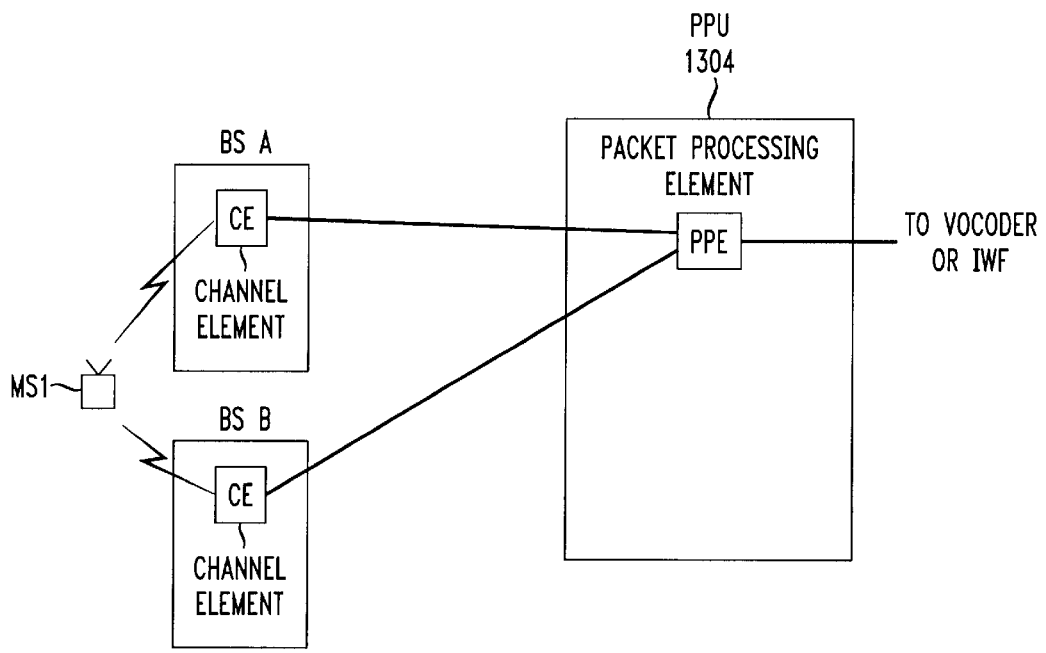
FIG. 13 shows an illustrative packet processing element (PPE) connectivity for a single channel soft handoff.

In an illustrative operation shown in FIG. 13, each physical PPE, in an SDU 1304, may terminate links from multiple channel elements CEs of the multiple BSs. The packet or circuit switched network 1203 of FIG. 12 (not shown in FIG. 13) provides complete connectivity, so that each channel element can be connected to any PPE. As shown in FIG. 13, for a single voice call from a mobile MS1, during soft handoff, one channel element CE at more than one BS, e.g., BSA and BSB, is assigned to the call. However, all these CEs in soft handoff must connect to the same PPE in PPU 1304, where frame selection in the reverse direction, and frame distribution in the forward direction (together referred to herein as FSD) is implemented. This also applies to circuit-mode data (IS99) and packet mode data (IS657) standards. The PPEs are completely shared between voice and data calls. As discussed below, the actual processing required on the PPE for voice and data calls is different. Data calls, in addition to the FSD function, also require encryption/decryption (ENC) and radio link protocol (RLP) to be implemented on the PPE. As previously described in FIG. 12, from the PPE, the call is connected to the Vocoder pool 1206, or a Data IWF 1207 or 1208, as appropriate.

Figure 14:
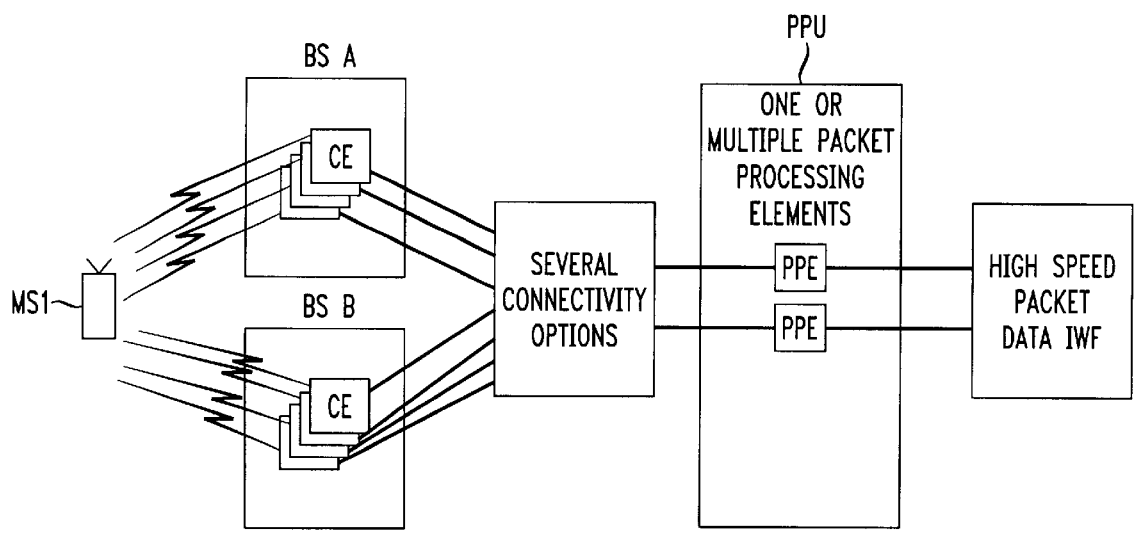
FIG. 14 shows an illustrative packet processing element (PPE) connectivity for a soft handoff for a high speed packet data service.
Figure 15A:
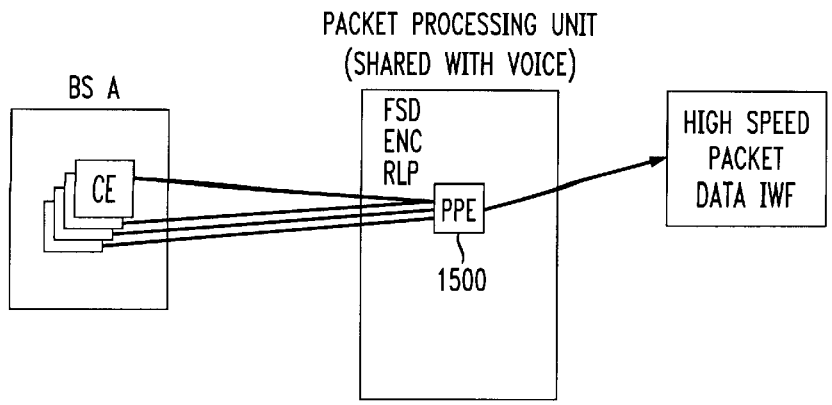
Figure 15B:
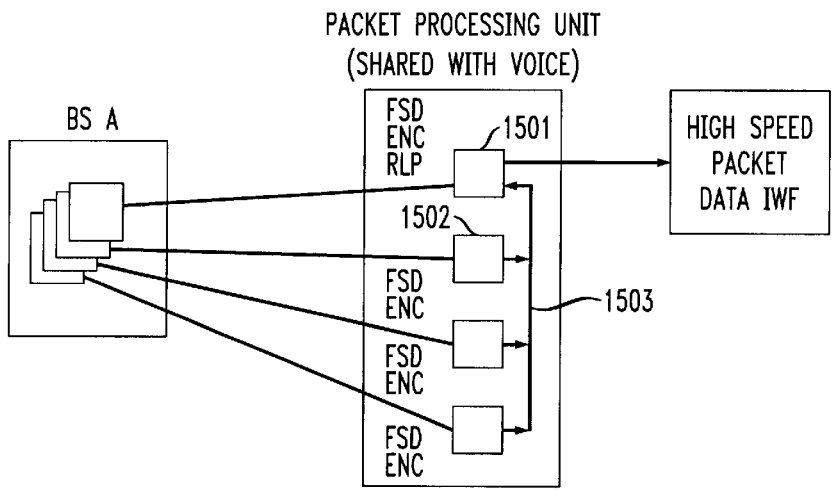
Figure 15C:
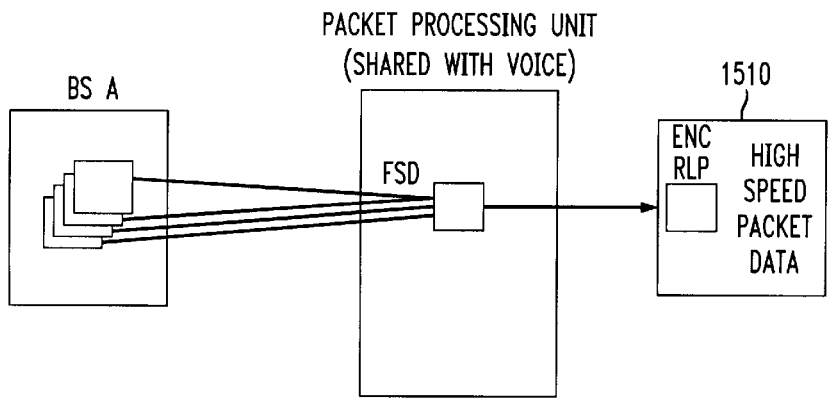

Voice and data calls have very different processing requirements on the PPE. Voice requires only frame selection and distribution (FSD), while data requires encryption ENC and Radio Link Protocol RLP. The provision of the ENC and RLP functions is at least 4–5 times more processing intensive than providing the frame selection FSD function. When a single mobile requests high speed packet mode data service, as discussed above, it is provided multiple channels. When a burst capability is allocated to a mobile during soft handoff, multiple channel elements at each base station are assigned to the mobile as shown in FIG. 14. Much of the processing burden at the PPE for the high speed data service is per channel (frame selection and distribution FSD, encryption ENC). This implies that the assignment of a high speed packet data "call" to a PPE can create an imbalance on the PPE processing. Since the PPE processing capacity is shared with multiple (voice or data) users, this processing burden can affect other calls. However, since, the packet or circuit switched network 1203 provides rich connectivity between channel elements CE and PPE, many other connectivity options are possible. In FIGS. 15A–15C, we describe several such connectivity options. These options differ in the features supported and the required development complexity. These aspects are discussed below.

The primary purpose is to attempt to smooth out peak processing requirements on the PPE, and avoid impacting other concurrent calls on a PPE. The following features are considered:

1. Frame Selection/Distribution (FSD), Encryption/Decryption (ENC) and Radio Link Protocol (RLP) functions can be separated. There is only one instance of RLP per high speed data "call".
2. FSD cannot be delayed. To keep the throughput on the cellular link high, RLP must not be delayed. However, encryption/decryption may be given lower priority processing. Thus, the data can be pre-encrypted when buffered, and decryption can be done while smoothing out processing peaks.
3. RLP must be collocated with the FSD on the basic channel to be able to handle dim and burst signaling, or if data is to be carried as the secondary traffic with voice as primary. However, these features seem to be of doubtful value for high speed packet data service, as discussed under Option C below.

Option A

First consider the options where, the entire processing of the multiple channels for a high speed data call are located on the same PPE (1500 of FIG. 15A). This is conceptually simple, but suffers from peak processing problems when multiple high speed calls are assigned to the same PPE, and bursts occur simultaneously. We propose several methods to reduce the peak processing burden.

There is a per-sector air interface resource constraint. One way to ensure efficient use of PPE resources is to have the PPE resources dedicated to high speed data per sector. For example, a high speed data user is assigned PPE resources at a location dedicated to all high speed data users whose primary sector is the same. This implies that the peak processing requirement at the PPE will never exceed the processing requirement for data at a sector. However, this method implies that a PPE handoff must be completed at every primary transfer event.

PPE handoff is somewhat complex and is accomplished following the primary transfer. Both the primary (BSC) transfer and PPE transfer may be handled simultaneously.

This task is further justified if 1) high speed data users undergo fewer handoff events, 2) no high speed data transfer is allowed while a handoff event (i.e., to add or drop a leg) is in progress. Finally, PPE transfer is also used for inter-service-provider or inter-vendor voice calls.

Another option is to assign, for example, one high speed data user per PPE. This effectively bounds the inefficiency per PPE to be that used by one high speed data user: one high speed data user (less than) 16 equivalent voice users or 4 low speed data users. This may be an inefficient use of PPE resources except where the number of high speed data users is small. This is because in PPE implementation, the capacity of the main processor [e.g., one of more Digital Signal Processors (DSPs)] that handles FSD, ENC, RLP exceeds the voice handling capacity of the DSPs. That is, there is processing slack that can better be handled by a high speed data processing unit (e.g., as shown by 1510 of FIG. 15 C).

Another option is to separate the PPEs handling voice and data, and thus avoid affecting voice calls. This may also be an inefficient use of PPE resources. However, unlike what is shown in FIG. 12, in such an implementation, the vocoders 1206 are also merged into the PPE. This makes the PPE expensive. A PPE dedicated to handling packet processing function only can be quite inexpensive and have lots of capacity to handle a large number of high speed data channels. This option can also benefit from PPE handoff. Thus a cluster of PPEs for data can handle high speed data from a large cluster of cells. The sizes of the cluster of PPEs and the assigned cluster of cells is determined to ensure that excessive processing is required with small probability (i.e. determine the probability that the number of simultaneous bursts on a PPE exceeds its capacity). This clustering will help reduce the required number of PPE transfers substantially.

Option B

With reference to FIG. 15B, a very general solution is to assign PPE resources dynamically per CE for a burst. Since CEs can address PPE resources (anywhere) this ensures most efficient use of PPE resources. The PPE 1501 associated with the basic CE channel does RLP and collation for all of the other CEs. This implies that air interface frames in the Packet or Circuit Switched Network 1203 (e.g., a 5E switch) must travel multiple hops on the PPE interconnect 1503 as they first traverse to the PPE assigned to the CE, e.g., 1502, for the burst and then to the PPE-Basic 1501 assigned to the high speed data call. Processing FSD and ENC require about 4 times as much processing as RLP and, therefore, justifies this approach to off-loading the processing burden for each CE on to a separate PPE.

In such an embodiment, the PPEs have to buffer data from several high speed data bursts. Compared to the packet bus load for a circuit data call, this approach adds one additional packet on the packet bus per channel. That is the increase is from 3 packets every 20 msec, to 4 packets every 20 msec, an increase of 33%. Such an embodiment also provides for the dynamic (per burst) assignment of PPEs.

This option still provides collocation of FSD and RLP processing, and thus permits the following features that are available in IS-95 today: dim and burst signaling and data as secondary traffic. By eliminating these features more options are possible as discussed below.

Option C

Collocation of RLP with FSD on the basic channel PPE 1501, to be able to handle dim and burst signaling, or data as secondary traffic may be of little value for high speed data mobile. These were crucial requirements for the current (low speed) packet data service. The mobile today has only one code, and the division of the air interface frame in IS-95, into primary traffic bits and secondary or signaling traffic bits offered a useful early voice-data integration and avoided blank and burst signaling. But the high speed data mobile has multiple codes. There is no need to multiplex voice and data or data and signaling on the same burst. Voice data integration may be provided by using different codes for voice and data. Blank and burst signaling is not so bad for data. It only results in additional delay, as the "blanked" frame can be transmitted in the next burst. Or the "blanked" frame will have to be recovered through retransmission. With multiple channels, these forced retransmissions are a small overhead.

These decisions imply that the PPE functions for voice and data calls are identical: namely FSD. Both RLP and ENC have been moved out of the PPU on to a high performance processing platform (IWF), 1510, as shown in FIG. 15C. Here again the RLP can be run at a higher priority than ENC, while ensuring that the ENC does not starve the transmitting RLP. Such an arrangement should ensure that the "remoted" RLP does not starve the high speed air interface, while the buffers at the PPE must be kept small to avoid reduced throughput due to additional round trip delay. Since blank and burst signaling is not detected at the RLP it must be recovered through retransmission. If blank and burst feedback is provided to the RLP, then the "blanked" frame can be retransmitted with a small delay.

Types of Service

Up to M channels can be assigned simultaneously to a single mobile user. Bandwidth constraints may permit up to fifteen 8 kbps channels or up to eight 13 kbps channels. However, mobile receiver constraints may restrict this further to a maximum of 4–6 simultaneous channels.

There are two types of service possible:

single active user: in which there can be only one user active on multiple channels (per carrier per cell).

multiple active users: in which multiple users can be active on multiple channels on the same carrier and in the same cell.

While a single active user service may offer a simple limited alternative to introduce the high rate service, multiple active users service is more attractive and efficient. When requests from multiple users are outstanding, better utilization is achieved if the bandwidth is shared among multiple high rate users, than if all the bandwidth is assigned to one users and the others are asked to wait. The present invention permits multiple simultaneous high speed users.

Base Station Architecture

High speed data service is defined where we permit multiple active users per base station. That is, several high rate data users to be simultaneously active with n1, n2, . . . active channels. The service is asymmetric so that multiple channels on the forward and reverse links are in use by different mobiles. In the channel element (CE of FIG. 12) hardware the mobile's (public or private) long code mask is used as the spreading code on the reverse link and is used as the privacy mask on the forward link. By using different masks for the forward (scrambling) and the reverse (spreading), the same CE can be used for transmissions to one mobile on the forward link and reception from another mobile on the reverse link. For reverse inner loop power control the mobile must rely on the power control bits from the basic channel only.

Finger Acquisition and Tracking

Since CEs are assigned for a burst duration to a mobile, they should synchronize up to the mobile (finger acquisition and tracking) in a time that is much shorter than a frame duration. Since the mobile is already up on the basic channel and has up to three fingers in lock, the finger tracking delays are known at the basic CE. This information is extracted from the basic CE and provided to the additional data CEs. Even if this information is delayed and noisy, it helps narrow down the finger acquisition search window at the multiple data CEs substantially thus permitting finger lock in a short period prior to the burst. If necessary, the mobile could be required to transmit a preamble (of the type used on the access channel) to assist in the finger lock (acquisition) at the data CEs. The current access channel preamble is one frame—with the additional finger tracking information from the basic CE the preamble needed can be reduced substantially.

Reverse Link Channels

The additional reverse channels assigned in the high data rate burst mode may be chosen to be base station specific or mobile specific.

Mobile specific: Each high rate mobile can use M−1 PN sequence masks derived from its basic PN sequence. Each mask corresponds to a different PN sequence shift. The mobile may use different masks derived from its basic PN sequence mask. For example, with the 42-bit public or private mask specified in IS-95, the mobile station and the BS can derive other masks by modifying a known subset of bits of the basic mask according to pre-specified rules. Thus, in one embodiment, the number of the additional channel from 1–7 may be modulo 8 added to bits 35–38 of the basic mask.

Many other realizations are possible.

Base Station specific: In this case, M−1 PN sequence masks are chosen, providing M−1 shifts of the long PN sequence for each sector of each base station from the long PN sequence. This is similar to the way the sector specific PN sequences are assigned on the forward link.

In the base station specific case, the base station would, through periodic broadcasts, inform all the mobiles in its region the PN masks that are used for data service. When a mobile is granted permission to transmit high data rates, it would use the predefined codes. Since the mobile transmits using the high speed data specific PN sequences associated with a particular (say, primary) sector, all other sectors receiving the mobile in soft handoff must dedicate resources to receiving transmissions on the data specific PN sequences of all neighbors. The number of dedicated PN sequences and hardware dedicated to these channels increases rapidly if the service is to be provided for users in soft handoff. Privacy concerns also point to using mobile specific PN sequence masks.

Based on this discussion, high speed data service should, preferably, be specified using mobile specific PN sequences on the reverse link. As discussed above, these are shifts of the "long" PN sequence generated from different PN sequence masks. The basic shift is derived from the mobile Electronic Serial Number (ESN) as is the case today. Additional shifts are generated using fixed rules and derived from the basic PN sequence mask. Similarly, predefined rules may also be applied to the basic private PN sequence mask.

Forward Link Channels

Multiple Walsh codes are assigned to provide the high data rate burst capability at each base station with which a mobile is in soft handoff. The Walsh codes to be used for high data rates can be dedicated in the case of a fixed allocation. For dynamic allocation any available Walsh code is assigned as necessary.

In a fixed scheme, to simplify the mobile implementation, it is possible to pick sets of Walsh codes, having a specific relationship therebetween, to provide the high speed data service. Thus the Walsh codes for the additional channels assigned during a burst could be selected using this specific relationship. The fixed scheme may also be effective in minimizing channel set-up delays at the base station and at the mobile. However, the fixed scheme is wasteful of base station resources. The dynamic scheme, on the other hand, uses the available bandwidth pool for data service, but any available Walsh codes are assigned. This has advantages in terms of efficient use of base station resources, but could suffer from assignment delays during forward burst transmission.

There is also an advantage of assigning a contiguous set of Walsh codes to the mobile for additional channels. This limits the size of the burst assignment message, where the mobile station needs to be informed of the specific Walsh codes to receive. With a contiguous set of Walsh codes assigned, the assignment message can be coded more efficiently.

Service Characteristics

As discussed above, a burst mode, demand assigned packet service is most appropriate. Multiple high speed data users in a coverage area share the available CDMA carrier bandwidth. The bandwidth is network controlled and a burst request may be denied for reasons of (i) fair sharing, or (ii) unacceptable (excessive) interference on the reverse link. The service is asymmetric in the sense that the bandwidth (channels) on the forward and reverse links may be assigned to different users. This also has implications on the reverse inner loop power control.

With reference to FIG. 11, we define a burst mode high speed data service slot equal to k IS-95 air interface frames. So a slot is equal to 20 k msec. A choice of k=12–25 is appropriate corresponding to a slot duration of 240–500 msec. Bursts are allocated in multiples of slots. Thus burst requests may specify the length of burst Lmax (in slots). The maximum value of Lmax is in the range 10–20 slots.

When the mobile makes a burst request or a burst destined for the mobile arrives at the network, the network uses methods and algorithms that utilize our previously described Load and Interference based Demand Assignment (LIDA) technique to determine access for reverse link bursts.

With reference to FIG. 16, the procedure for high data rate assignment on the forward link are similar to the reverse link procedures described earlier in this specification. The major difference is that on the reverse link the pilot strength measurements provided by the mobile during burst request are used by the BS to determine admission. This method is used to control the impact of high speed data bursts on the Eb/No and outage of voice users.

When a Forward Burst Request 1610 is received by the AC, the burst negotiation proceeds as previously described in steps 1602–1606. Following the burst assignment, message 1606a and 1606b forward link transmissions to the mobile can begin. For the forward link burst admission, only the current load, power budget and channel availability at the BSs are used. Burst negotiation procedures are performed between the AC and the multiple BSs that the mobile station is in soft handoff with.

The data burst assignment message (e.g., 415 of FIG. 4) gives the mobile the permission to transmit on multiple channels, simultaneously. The assignment message also specifies the permitted length b of the burst (in slots), as well as the next slot boundary at which the mobile is to begin transmission. The burst assignment can be terminated by the network prior to the expiry of b slots by sending a data burst termination message. The burst may be terminated, for example, (a) if the bandwidth is required to carry new voice call arrivals, or (b) if the mobile requires a soft handoff event: add or drop a leg. For the implementation it is convenient to terminate high speed bursts in progress and then continue with the soft handoff procedure. This avoids handoffs involving multiple reverse channels. A burst termination message is used to terminate the high speed burst.

For a forward link burst assignment, after the burst negotiation procedure is complete the AC transmits a burst assignment message to the MS via the multiple BSs to prepare the mobile to expect forward channel transmisisons on multiple channels. Again, the assignment message also specifies the permitted length b of the burst (in slots), as well as the next slot boundary at which the BS is to begin transmission. As before, the burst assignment can be terminated by the network prior to the expiry of b slots by sending a data burst termination message. The burst may be terminated, for example, (a) if the bandwidth is required to carry new voice call arrivals, or (b) if the mobile requires a soft handoff event: add or drop a leg. For the implementation it is convenient to terminate high speed bursts in progress and then continue with the soft handoff procedure. This avoids handoffs involving multiple forward channels.

Power Control

Power control bits have to be sent on the forward link according to what is being received on the reverse link. Although the service is asymmetric, that is, when the mobile transmits on multiple channels on the reverse link, it may not have a high speed burst transmission on the forward link. However, the basic channel to the mobile is full duplex. Therefore, the mobile should transmit identical power on all four links, as controlled by the basic channel. During a forward link burst, where the mobile is not transmitting a high speed burst on the reverse link, the mobile should ignore the power control bits on the forward channels other than the basic channel. Note that our use of only the basic channel for reverse inner loop power control is consistent with the asymmetric service, even in the case that the mobile happens to get burst transmissions on the forward and reverse channels simultaneously.

If the basic channel is the only one used for power control on the reverse link, then using the power level determined to transmit partial rates to control full rate transmissions on the other channels is not acceptable. This implies that only full rate must be transmitted on the basic channel during multiple channel transmissions. (That is, 2×, 3×, 4×, . . . , are allowed, but not fractional rates such as 2.5×, 3.25×, etc.). This restriction appears to be reasonable. Also, the same reasoning applies to the forward link, but not as strongly.

We have assumed that since the reverse link power control is very fast, one basic rate frame may be adequate for the power control to work. This is not the case for the forward link (especially for Rate Set 1). That is, after a long idle period, the base station must determine the forward power transmission level required for 1% forward FER to the mobile. For Rate Set 2, we may assume that the forward link power control that was active during the eighth rate transmission is good enough. If the forward transmit power is inadequate some frames will be lost. These will have to be recovered through RLP.

SUMMARY

When the present invention is implemented as a MC-CDMA system with LIDA, it offers the following features:

It provides data services at high access bandwidths with minimal changes to the IS-95 air interface and the IS-99 data standard (up to 56 kbps for IS-99-based CDMA and related standards).

It is well suited for use with sub-code concatenation, as described in the previously referenced patent.

The high bandwidth demand assignment per burst is based on load and channel conditions.

Access control in the network ensures priority for voice and other high priority users.

It uses transmitter oriented codes with dedicated receivers per connection.

It sacrifices (some) Forward Error Correction (FEC) in favor of retransmission using ARQ to reduce $E_b/N_0$ requirement, and increase capacity.

Although our control scheme provides high rate access using MC-CDMA, the control scheme, LIDA, presented is transparent and thus equally applicable to any physical layer implementation of higher data rate access over CDMA.

What has been described is merely illustrative of the application of the principles of the present invention. Other arrangements and methods can be implemented by those skilled in the art without departing from the spirit and scope of the present invention.

We claim:

1. In a code division multiple access system including an access controller and multiple cells, each cell having a base station and multiple mobile stations, a method of allocating bandwidth to a mobile station comprising the steps of:

at the access controller, receiving a data burst request requesting a first data rate in excess of the basic data rate B allocated to a mobile station of a first cell, determining an increased data rate which is to be granted to said mobile station without causing excessive interference at said first cell and at least one adjacent cell; and transmitting a data burst assignment to a base station of said first cell indicating the increased data rate which has been granted to said mobile station.

2. The method of claim 1 wherein the data burst request is a request received from said mobile station requesting an increased data rate over a basic data rate for a reverse link connection to the base station of said first cell.

3. The method of claim 2 wherein the data burst request received from said mobile station includes pilot strength information for the base station of said first cell and a base station of at least one cell adjacent to said first cell and wherein the access controller uses the received pilot strength information to determine an increased data rate which is to be granted to said requesting mobile station without causing excessive interference at said first cell and said at least one adjacent cell.

4. The method of claim 1 wherein the data burst request is a request received from a network external to the system, already in connection with said mobile, requesting an increased data rate for an forward link connection between said mobile and the base station of said first cell.

5. The method of claim 2 wherein said increased data rate uses multiple basic data rate units, including the original basic data rate unit, each unit using a different CDMA channel and wherein the base station uses a separate channel element for interfacing to each CDMA channel.

6. The method of claim 5 wherein finger tracking information obtained in a channel element used for a CDMA channel of the original basic data rate unit are used by all of the channel elements.

7. The method of claim 1 wherein said increased data rate from the mobile station uses multiple basic data rate units, each unit using a different CDMA channel and wherein the system includes a Packet Processing Element (PPE) for processing all Frame Selection and Distribution (FSD), Encryption (ENC) and Radio Link Protocol (RLP) data for each of the multiple CDMA channels received from a base station.

8. The method of claim 1 wherein said increased data rate for the mobile station uses multiple basic data rate units, each unit using a different CDMA channel and wherein the system includes a Packet Processing Element (PPE) for processing all Frame Selection and Distribution (FSD), Encryption (ENC) and Radio Link Protocol (RLP) data for the original basic data rate CDMA channel and a separate PPE for processing all FSD and ENC data of remaining ones of the multiple CDMA channels.

9. The method of claim 1 wherein said increased data rate from the mobile station uses multiple basic data rate units, each unit using a different CDMA channel and wherein the system includes a Packet Processing Element (PPE) for processing all Frame Selection and Distribution (FSD) and a Interworking Function (IWF) unit for processing all Encryption (ENC) and Radio Link Protocol (RLP) data for each of the multiple CDMA channels.

10. The method of claim 2 wherein power control in any CDMA channel of the reverse link is based on the power control of a basic data rate CDMA channel of the reverse link.

11. The method of claim 4 wherein power control in any CDMA channel of the forward link between the base station of said first cell and said mobile is based on an error rate of the basic data rate CDMA channel forward link.

12. The method of claim 1 wherein when said mobile station is in soft handoff with at least two base stations, burst negotiation occurs between access controller and the base stations, over existing voice and data packet connections.

13. The method of claim 2 wherein said mobile station uses one or more different code masks derived from a basic PN sequence mask for one or more additional codes used to transmit at the increased data rate, the one or more code masks obtained by modifying a known subset of the basic PN sequence mask in accordance with pre-specified rules.

14. The method of claim 4 wherein the base station uses Walsh codes having a pre-specified relationship therebetween for one or more additional Walsh codes used to transmit at the increased data rate.

15. The method of claim 14 wherein the pre-specified relationship is that the Walsh codes are contiguous.

16. The method of claim 1 where the increased data rate allocation is done on a slot basis, each slot including multiple frames of predefined duration.

17. The method of claim 1 wherein following a data burst request received prior to a predetermined interval before the beginning of a slot, each of the at least two base stations determine the increased data rate available at that base station and send an allocation response to the access controller at a predetermined time before said slot.

18. The method of claim 1 wherein the data burst assignment lasts for a predetermined time, and following a continuation request, a new data burst assignment is not transmitted if it is unchanged from the previous data burst assignment.

19. The method of claim 1 wherein the determining step at the access controller is responsive to an allocation response from a base station, where said base station gives priority to data burst continuation requests for a mobile over new data burst requests for a different mobile.

20. The method of claim 1 wherein the determining step at the access controller is responsive to an allocation response from a base station, where said base station allocates resources to data burst requests from different mobiles based on their priority.

21. The method of claim 1 wherein the determining step at the access controller is responsive to an allocation response from a base station, where said base station fairly allocates resources to all data burst requests from different mobiles of equal priority.

22. An access controller for use in a code division multiple access system including multiple cells, each cell having a base station and multiple mobile stations, the access controller comprising, means for receiving a data burst request requesting a first data rate in excess of the basic data rate B allocated to a mobile station of a first cell, means for determining an increased data rate which is to be granted to said mobile station without causing excessive interference at said first cell and at least one adjacent cell; and means for transmitting a data burst assignment to a base station of said first cell indicating the increased data rate which has been granted to said mobile station.

23. The access controller of claim 22 wherein the data burst request is received from said mobile station and includes pilot strength information for the base station of said first cell and a base station of at least one cell adjacent to said first cell and wherein the access controller uses the received pilot strength information to determine an increased data rate which is to be granted to said requesting mobile station without causing excessive interference at said first cell and said at least one adjacent cell.

24. The access controller of claim 22 wherein said increased data rate for the mobile station uses multiple basic data rate units, each unit using a different CDMA channel and wherein the system includes a Packet Processing Element (PPE) for processing all Frame Selection and Distribution (FSD), Encryption (ENC) and Radio Link Protocol (RLP) data for each of the multiple CDMA channels received from a base station.

25. The access controller of claim 22 wherein said increased data rate for the mobile station uses multiple basic data rate units, each unit using a different CDMA channel and wherein the system includes a Packet Processing Element (PPE) for processing all Frame Selection and Distribution (FSD), Encryption (ENC) and Radio Link Protocol (RLP) data for the original basic data rate CDMA channel and a separate PPE for processing all FSD and ENC data of remaining ones of the multiple CDMA channels.

26. The access controller of claim 22 wherein said increased data rate for the mobile station uses multiple basic data rate units, each unit using a different CDMA channel and wherein the system includes a Packet Processing Element (PPE) for processing all Frame Selection and Distribution (FSD) and a Interworking Function (IWF) unit for processing all Encryption (ENC) and Radio Link Protocol (RLP) data for each of the multiple CDMA channels.

27. In a code division multiple access system including multiple cells, each cell having a base station and multiple mobile stations, a method of allocating bandwidth to a mobile station in soft handoff with at least two base stations, comprising the steps of:

at an access controller, receiving a data burst request requesting a first data rate in excess of the basic data rate B allocated to that mobile station;

requesting, in response to the burst request received from the at least two base stations, an increased data rate from the two base stations;

receiving an allocation response from each of the at least two base stations indicating an increased data rate available at that base station;

transmitting a burst assignment from the access controller to the at least two base stations indicating an allocated increased data rate which may be granted to said requesting mobile station, said allocated increased data rate determined from the allocation response received from the at least two base stations.

28. The method of claim 27 wherein the allocated increased data rate does not exceed the minimum of the allocated increased data rates received in the allocation response from the at least two base stations.

29. The method of claim 27 wherein the burst request includes pilot strength information for the at least two base stations.

30. The method of claim 27 further comprising the steps of:

at the access controller, following the allocation response step, transmitting an allocation request to the at least two base stations indicating an preliminary increased data rate which may be granted to said requesting mobile station, said preliminary increased data rate not exceeding the minimum of the two increased data rates received from the at least two base stations, receiving a second allocation response from each of the at least two base stations indicating an updated allocated data rate available at that base station, and wherein the burst assignment of the transmitting step indicates the updated allocated increased data rate which is to be granted to said requesting mobile station.

31. A code division multiple access system including multiple cells, each cell having a base station and multiple mobile stations, the system further comprising at least two base stations, each including a controller means for controlling the receiving of a data burst request from a mobile station requesting a first data rate in excess of the basic data rate B allocated to that mobile station;

transmitting of an allocation response to the access controller in response to a received request for an increased data rate from the access controller; and receiving of a burst assignment from the access controller indicating an allocated increased data rate which may be granted to said requesting mobile station; and said access controller, for controlling the requesting, in response to the data burst request received from the at least two base stations, an increased data rate from the two base stations;

receiving of the allocation response from each of the at least two base stations indicating an increased data rate available at that base station; and transmitting of the burst assignment from the access controller to the at least two base stations indicating said allocated increased data rate which may be granted to said requesting mobile station, said allocated increased data rate not exceeding the minimum of the two increased data rates received from the at least two base stations.

* * * * *